United States Patent [19]

Hosoe

[11] Patent Number: 5,287,166
[45] Date of Patent: Feb. 15, 1994

[54] DISPLACEMENT METER WITH STARED DISPLACEMENT VALUES

[75] Inventor: Shigeru Hosoe, Sagamihara, Japan

[73] Assignee: Konica Corporation, Tokyo, Japan

[21] Appl. No.: 730,649

[22] Filed: Jul. 16, 1991

[30] Foreign Application Priority Data

Jul. 20, 1990 [JP] Japan .................................. 2-192752
Jul. 20, 1990 [JP] Japan .................................. 2-192753
Jul. 23, 1990 [JP] Japan .................................. 2-195998

[51] Int. Cl.⁵ .............................................. G01B 9/02
[52] U.S. Cl. ..................................... 356/358; 356/345
[58] Field of Search ............... 356/358, 345, 349, 351, 356/363

[56] References Cited

U.S. PATENT DOCUMENTS

| | | | |
|---|---|---|---|
| 4,139,304 | 2/1979 | Redman et al. | 356/358 |
| 4,360,271 | 11/1982 | Downs et al. | 356/351 |
| 4,643,577 | 2/1987 | Roth et al. | 356/358 |
| 4,655,594 | 4/1987 | Wittekoek et al. | 356/363 |
| 4,792,230 | 12/1988 | Naganuma et al. | 356/345 |

OTHER PUBLICATIONS

"Optical and Electro-Optical Engineering Contact", vol. 26, No. 2, (1988), pp. 107–108.
"High-Resolution Laser Encoder and High-Accuracy Index Unit as Applications of Laser Encoder", National Technical Report, vol. 36, No. 2, Apr. 1990, pp. 114–120.

*Primary Examiner*—Samuel A. Turner
*Attorney, Agent, or Firm*—Finnegan, Henderson, Farabow, Garrett & Dunner

[57] ABSTRACT

Laser displacement meter for measuring a displacement of an object such as a moving distance, a moving angle, and a moving speed. The meter has a generator circuit for generating a displacement signal; another generator circuit for generating a first signal which corresponds to $R\sin\theta$ value of the displacement signal, and a second signal which corresponds to $R\cos\theta$ value of the displacement signal (R represents an amplitude, $\theta$ represents a phase of the displacement signal); a memory for storing a displacement value being defined by the first signal and the second signal where $\theta$ is between 0 and $2\pi$; a circuit for transferring a position signal corresponding to the displacement value from the memory according to the first signal and the second signal; a counter for counting a number, being defined as dividing $\theta$ by $2\pi$, corresponding to the displacement signal and for determining the displacement of the object according to the counted number and the position signal.

9 Claims, 15 Drawing Sheets

DISPLACEMENT METER WITH STARED DISPLACEMENT VALUES

BACKGROUND OF THE INVENTION

The present invention relates to a displacement meter such as a laser length measuring apparatus used for measurement of a length, displacement and velocity, a linear encoder and a rotary encoder, and more particularly, to a displacement meter wherein electric signals varying with R sin$\theta$ and R cos$\theta$ (where, R represents an amplitude $\theta = 2\pi\alpha/S$, S is a predetermined frequency) are obtained from $\alpha$ that is a distance of movement in one direction of a movable object and these two types of signals give numerical value of $\theta$.

For example, a laser length measuring apparatus of an interference fringes counting type, as shown in FIG. 10 and as disclosed on pages 107–108 of "Optical and Electro-optical Engineering Contact" Vol. 26, No. 2 (1988), is one of the above-described displacement meter.

In the laser length measuring apparatus mentioned above, a linearly polarized beam with a wavelength of $\lambda$ from stabilized laser 101 is split by beam splitter 102 into a path of a reference beam having $\lambda/8$ plate 103 and fixed corner cube 104 and a path of a length measuring beam having movable fixed corner cube 105. When the reference beam split in the path of a reference beam passes through the $\lambda/8$ plate twice, the reference beam is converted to a circularly polarized beam. The reference beam that is a circularly polarized beam and the length measuring beam that is a linearly polarized beam and is split in the path of a length measuring beam are combined together again by beam splitter 102 and then divided into two. One of the divided two beams is further divided into two by polarized beam splitter 106 so that the length measuring beam may be two divided beams each inclining by 45° against the polarization plane of the length measuring beam, thus three types of divided beams are obtained. These three types of divided beams, when they pass through filter 107 and polarization plate 108 respectively, are converted to three types of interference beams whose phases interfered by the movement in one direction of movable corner cube 105 are deviated by 90° in succession. When each of these three types of interference beams enters detecting unit 109, such as a photodiode, they are converted to three types of electric signals whose phases are deviated by 90° from each other. After the three types of electric signals are amplified by calculation amplifier 110, wherein the amplitude and the center of amplitude of each electric signal are aligned, they are grouped into two groups each having two neighboring electric signals whose phases are deviated by 90°. When these two groups of electric signals enter calculation amplifier 111, wherein calculation of sin (x - y) is made, electric signals which vary with R sin$\theta$ and R cos$\theta$ (where, R represents an amplitude, $\theta = 2\pi$ (Lm-Lr)$\lambda$, Lr is a certain length of a reference beam path, Lm is a length of a measuring beam path changing by $2\alpha$ with a movement distance $\alpha$ in one direction of movable corner cube 105, namely a predetermined frequency $S = \lambda/2$) and have phases deviated by 90° are obtained. Since these electric signals are obtained from the difference of neighboring signals of three kinds of interference fringes signals, as deviated by 90° successively in terms of a phase, outer disturbance, such as intensity variation of laser beam, is canceled and the center of signal level is constantly fixed. Thus an error of counting interference fringes is reduced and measurement with high accuracy can be realized. By inputting both electric signals mentioned above in signal processing circuit 112, wherein a comparison circuit calculating with a counter by obtaining pulse signals from both electric signals, a differentiating circuit, a waveform shaping circuit, an OR circuit and a counting circuit composed of a pulse counter are employed. Alternatively, in signal processing circuit 112 composed of a digital calculation circuit which includes A/D converter and conducts calculation of $$\theta = \tan^{-1} (R \sin\theta / R \cos\theta) \quad (1)$$

or further of $$R = \sqrt{(R \sin\theta)^2 + (R \cos\theta)^2} \quad (2)$$

and of a discrimination circuit that obtains logically the direction of $\theta$ change from both electric signals, $\theta$, namely $\alpha$ and the direction of up-counting/down-counting, or Lm is obtained.

FIG. 2 shows the relation between R and $\theta$, which indicates lissajour's figure of R sin$\theta$ and R cos$\theta$ having 90° phase difference.

Even in the displacement meter, such as a magnetic or a optical rotary encoder or linear encoder shown on pages 114–120 of National Technical Report Vol. 36, No. 2, April issued in 1990, as well as in an interference fringes counting laser length measuring apparatus or a heterodyne interferometry length measuring apparatus employing two-frequency laser to be sure, and without limiting to the above-described laser length measuring apparatus, an angle of rotation and an amount of a linear displacement are measured by obtaining output signals of R sin$\theta$ and R cos$\theta$ and by obtaining $\theta$ by processing the above-mentioned signals with signal processing circuit 112 in the same way.

The above-mentioned signal processing circuit 112 employing a counter circuit requires comparison circuits in quantity of m, differentiating circuits in quantity of 2 m and waveform shaping circuit for each of the signals for the purpose of obtaining $\theta$ in an accuracy of $\pi/2$ m. Therefore, circuits tend to be complex in structure and thereby high in cost. Further, and it is difficult to practically to obtain $\theta$ in an accuracy as high as $\pi/2$ m, which has been a problem. By contrast, the aforesaid signal processing circuit 112 employing a digital calculation circuit can obtain $\theta$ in a high accuracy. However, in order to calculate equations (1) and (2) at high speed, even when a MC 68020 CPU is driven at 20 MHz, a high speed memory that can follow with non-wait is provided, and a high speed calculation element of MC68882 is used, not less than 10 $\mu$sec is required for obtaining the values of $\theta$ and R, while the total processing speed thereof is compelled to be 0.1 MHz or less by a digital calculation circuit speed, which has been a problem. In addition, in the case of an A/D converter that outputs offset binary, the central value of an amplitude of R sin$\theta$ and R cos$\theta$ has an offset value D. Therefore, the calculation is to be conducted not for equations (1) and (2), but for equations (3) and (4) shown below, which means that the calculation speed is compelled to be even slower.

$$\theta = \tan^{-1} [(R \sin\theta - D)/(R \cos\theta - D)] \quad (3)$$

$$R = \sqrt{(R\sin\theta - D)^2 + (R\cos\theta - D)^2} \quad (4)$$

Under the background mentioned above, an idea occurred to the inventors of the present invention. According to the idea, if the signals of R sinθ and R cosθ are used, without being subjected to the calculation processing on a real time basis for obtaining θ, but rather as a reading signal for reading the value of relevant θ from a memory wherein various values of θ corresponding to various groups of R sinθ and R cosθ are stored in advance. As such, the value of θ in a high accuracy would be obtained at high speed, and the signal processing circuit would be capable of being inexpensive and compact in structure. From the idea, the inventors have devised a displacement meter wherein the signals obtained from R sinθ and R cosθ through the digital conversion thereof are used as a reading signal for reading the relevant Θ value from a Θ memory, wherein various Θ values (where, Θ value is a digital value of Θ in $0 \leq \Theta = \theta - 2n\pi < 2\pi$, and n is a counted number described later) corresponding to various groups of both digital signals are stored in advance. The value of n is obtained by counting the frequencies of changes of Θ values from increase to decrease or from decrease to increase, thus the value of θ can be obtained from Θ value and n. With the displacement meter of the invention it is possible to obtain the value of θ in a phase resolution of $2\pi/256$ easily at the speed of 10 MHz or more.

However, when a conventional counting means wherein zero crossing detection in an analog circuit is conducted on a digital basis for counting is used as a means of up/down discrimination counting of Θ for counting the number of n, it is impossible to count unless Θ becomes zero each time. Therefore, when Θ is not the sampling speed that changes by 1 LSB each time, 0 is sometimes skipped and not counted, and thereby the changing speed of α is limited to be low, which has been a problem.

As such, the first object of the invention is to provide a displacement meter wherein the above-described problems have been solved and counting is conducted correctly and the accurate n can be obtained even when Θ does not become zero each time, and therefore, the value of θ in high accuracy can be obtained at high speed despite the high changing speed of α.

Further, a heterodyne interferometry laser length measuring apparatus in FIG. 16 can be used as a movable measuring apparatus wherein α signals showing the movement distance can be obtained from both electrical signals obtained through photo-electric conversion of measurement interference beams and electrical signals obtained through photo-electric conversion of two-frequency laser source beams.

In the movement measuring apparatus, after a laser beam having frequencies of $f_1$ and $f_2$ from two-frequency laser 1, wherein two-frequency laser is obtained by the use of Zeeman effect, the laser beam or an acous-to-optical effect is divided by polarization beam splitter 2. The laser beam having the frequency of f1 is reflected on movable mirror 3 (frequency of reflected beam is $f_1 \pm \Delta f_1$, where with regard to ±, "+" is for the leftward direction of movable mirror 3 and "−" is for the rightward direction thereof, and $\Delta f_1 = 2v/\lambda_1$ where v represents a speed of movable mirror 3 and $\lambda_1$ is a wavelength for frequency $f_1$). The laser beam having the frequency of $f_2$ is reflected on fixed mirror 4, and both reflected beams are combined by polarization beam splitter 2 to be an interference beam. The interference beam enters receiver 5 employing a photoelectric converting element. The receiver 5 inputs electric signals varying under the condition of $\sin 2\pi (F_2 - F_1 \pm \Delta f_1) t$ (t represents time) into a signal processor, and from two-frequency laser 1, electric signals varying under the condition of $\sin 2\pi (f_2 - f_1)t$ are inputted into the signal processor. An 8-bit phase detector on a measurement board with which the transfer of control signals and processing signals is made between the the signal processor and the control unit through a C/I board and multi-pass converts signals from both the receiver 5 and two-frequency laser 1. Thus, from both signals, information concerning the movement direction of movable mirror 3 and movement distance $vt = \lambda_1 \Delta f_1 \cdot t/2 = \lambda_1 (2\Delta f_1 \cdot t)/4\pi = \lambda_1 \alpha/4 \pi$ are obtained, and position information and speed information of movable mirror 3 against fixed mirror 4 are outputted through 32 bits to a display means or a drive control means for the movable mirror 3 through an accumulator data register.

The movement measuring apparatus employing a laser beam such as the one stated above is capable of obtaining a movement distance of the movable mirror 3 in a high accuracy of one thousandth of $\lambda_1$ or higher and can be utilized as a movement control device for a moving subject, as shown in FIGS. 17 and 18.

In the movement control device shown in FIG. 17, there is provided on base 6 the driving rail 7 equipped with a driving means, such as a feeding screw, for moving the moving object 8 and a motor. Fixed on the base 6 is the two-frequency laser 1, the polarization beam splitter 2 and the receiver 5. The movable mirror 3 is fixed on the moving object 8 that is moved by the driving rail 7 and the fixed mirror 4 is fixed on one end of the driving rail 7. Information concerning the position and speed of the movable mirror 3, namely of the moving object 8 against the fixed mirror 4 are obtained in the same way as that explained in FIG. 16. Based on the information thus obtained, the drive of the motor on the driving rail 7 is controlled. FIG. 18 is a top view showing an example of a lathe wherein a movement control device shown in FIG. 17 is used for movement control of both a tool carriage and a spindle. To be concrete, members in FIG. 18 which are the same as those in FIG. 17 are given the same symbols as in FIG. 17, and 1'-5' and 7'-8' represent the same functions as in 1-5 and 7-8. The moving object 8 is equipped with a tool post on which a cutting tool is clamped, and the moving object 8' is equipped with spindle 9 which rotates the work piece clamped thereon.

Since the movement control device in FIG. 17 employs a laser length measuring apparatus of the differential type shown in FIG. 16, with which relatively stabilized length measuring accuracy can be obtained easily, the movement of the movable mirror 3, namely of the moving object 8 against the fixed mirror 4, can be measured and controlled in a high accuracy as stated above. However, what is required in most cases is an accurate control for the movement of moving object 8, not against the fixed mirror 4, but against the base 6. In the movement control device shown in FIG. 17, there is employed a laser length measuring apparatus that can offer measurement information in high accuracy, and based on the measurement information, the movement of the moving object 8 is controlled accurately. In this case, when a temperature change causes the change in dimensions of the base 6 and driving rail 7, accuracy for the control of movement of the moving object 8 against the base 6 tends to be worse than the dimension change of the base 6. That is, the position of the moving object 8 against the base 6 is further deviated by an amount equivalent to the dimension change caused by the temperature change, even when the position of the moving object 8 from the fixed mirror 4 is as accurate as the measurement information. An example of this is shown in the lathe in FIG. 18. Namely, an amount of the movement in the arrowed direction of the moving object 8 provided with a tool post in FIG. 18 against a vertical plane including, for example, the spindle axis of the headstock, needs to be obtained accurately and an amount of the movement in the arrowed direction of the moving object 8' against a vertical plane including, for example, this side in the figure of the moving object 8, needs also to be obtained accurately. However, the best accuracy in which the aforesaid amount is obtained is only the one that is worse than the dimension change of the base 6. To be concrete, the movement of the movable mirror 3, that is, of the moving object 8 equipped with a tool post against the position of the fixed mirror 4, can easily be measured in accuracy as high as less than 0.1 μm. However, even the position of the moving object 8 located with positioning resolution of less than 0.1 μm can move by 2-3μm from the position of the axis of the spindle 9 when the ambient temperature changes by 1° C. This value of displacement corresponds to one hundred times of the positioning resolution.

The measures for solving the above-described problems include: (1) to provide the fixed mirror 4 on the reference position on the base 6, (2) to use materials free from the dimension change caused by the temperature change for the base 6 and the driving rail 7, or, (3) to control temperature so that the ambient temperature may not be changed. However, the method of the above-mentioned item (1) is impossible because it means that the fixed mirror 4 must be positioned at the location on the vertical plane that includes the axis of a spindle in the headstock 9 and thereby the movable mirror 3 hits the fixed mirror 4 when the moving object 8 moves. Further, the method of (2) is impossible because the materials mentioned in the item (2) are not available, and the method of (3) is also impossible because the object can not be attained unless the temperature change is controlled within a range of ±0.01° C.

From the viewpoint mentioned above, there may be considered a method wherein dimension change information is obtained from information of measurement of ambient temperature, information of distances of fixed mirror 4 and base 6, each from the reference position, and information of linear expansion coefficient of the base 6, and further wherein the moving object 8 is controlled in terms of its movement based on measurement information by means of a laser length measuring apparatus and the dimension change information. Even this method, however, can not solve the above-described problems because the dimension change information is nothing but an indirect presumed value.

Further, a movement measuring apparatus employing a laser beam such as the one mentioned above is for measuring the linear movement of a moving object and can not measure rotary movement. Though it can give an average speed of movement calculated from measurement time and a moving distance of a moving object within the measurement time, it can not obtain the momentary moving speed that changes moment by moment. Though it can be used directly for controlling programs as in examples of FIGS. 17 and 18, it can not be used directly for program controlling.

The invention has been devised also for solving the problems in a conventional movement measuring apparatus wherein a laser beam is employed. Its second object is to provide a movement measuring apparatus employing a laser beam which can be used for accurate measurement and control of the movement of a moving object against a base, for measurement and control of rotation for a minute angle of a moving object, for measurement of speed change of a moving object, and for programmed movement control of a moving object.

SUMMARY OF THE INVENTION the invention represents a displacement meter wherein electrical signals, varying under the conditions of $R \sin\theta$ and $R \cos\theta$ (where, $\theta = 2\pi a/S$, S is a predetermined frequency) and caused by movement distance $a$ of a moving object in one direction, are obtained. Two kinds of signals thus obtained are converted to digital signals which are used as reading signals for reading relevant $\Theta$ value from $\Theta$ memory in which various $\Theta$ values (where, $\Theta$ value represents a digital value of $\Theta$ in $0 \leq \Theta = \theta - 2n\pi < 2\pi$, n represents the number of counting explained later) corresponding to various combinations of the aforesaid two kinds of digital signals are stored in advance. The number of occasions for the change of $\Theta$ value from increase to decrease or from decrease to increase is counted to obtain n, thereby $\theta$ is obtained from the $\Theta$ value and n. The displacement meter is characterized in that when a constant k is set to 2, an up/down discrimination counting means which conducts up-count when $\Theta_1$ represents the value in the fourth quadrant and $\Theta_2$ represents the value in the first quadrant, while it conducts the down-count when $\Theta_1$ represents the value in the first quadrant and $\Theta_2$ represents the value in the fourth quadrant, and conducts nothing in other cases is used. Likewise, when k is set to 1, an up/down discrimination counting means which conducts the up-count when $\Theta_1$ represents the value in the third-fourth quadrants and $\Theta_2$ is smaller than $\Theta_1$ that is different from $\Theta_1$ by $\pi$. The up/down discrimination counting means conducts the down-count when $\Theta_1$ represents the value in the first - second quadrants and $\Theta_2$ is larger than $\Theta_1$, with setting of conditions wherein an interval of $\Theta$ values read successively is less than $\pi/k$ (where, k is 2 or 1) and with $\Theta_1$ that is a difference between $\Theta_0$ value read out when n is 0 and $\Theta_1$ value read out at arbitrary time thereafter and with $\Theta_2$ that is a difference between $\Theta_0$ value read out when n is set to 0 and $\Theta_2$ value read out thereafter. The aforesaid first object can be attained by the first example having the construction mentioned above.

Namely, in the displacement meter of the invention, a signal processing circuit is utilized which obtains $\theta$ by processing signals of $R \sin\theta$ and $R \cos\theta$, and then reading relevant $\Theta$ values from a $\Theta$ memory. Various $\Theta$ values obtained from equations (1) and (3) in terms of digital conversion signals of $R \sin\theta$ and $R \cos\theta$ are stored in advance, such that equations (1), (2), (3) and (4) are not subjected to the calculation processing. Therefore, the $\Theta$ values can be obtained at high speed and in a high accuracy. An up/down discrimination counting means wherein the up-count is conducted when the difference $\Theta_1$ between the $\Theta_0$ value for n that is 0 and the $\Theta_1$ value on the arbitrary point thereafter and the difference $\Theta_2$ between the $\Theta_0$ value for n that is 0 and the next $\Theta_2$ value change from $\Theta_1$ in the fourth quadrant to $\Theta_2$ in the first quadrant. Likewise, and the down-count is conducted when they change from $\Theta_1$ in the first quadrant to $\Theta_2$ in the fourth quadrant, and no counting is conducted in other cases. Alternatively an up/down discrimination counting means is provided wherein up-count is conducted when $\Theta_1$ in the fourth quadrant changes to $\Theta_2$, that is smaller than $\Theta_1$ depending on whether the interval of $\Theta$ values read out is set to $\pi/2$ or less or set to $\pi$ or less in the up/down discrimination counting means for $\Theta$ values. Therefore, accurate counting can be carried out even when the $\Theta$ value changes with 2LSB or more and measurement of $\theta$ can be carried out even when the changing speed of $\alpha$ goes up to the frequency speed that is one half or a quarter of the speed of reading $\Theta$ values, resulting in an inexpensive and compact signal processing circuit.

Further, the invention represents a movement measuring apparatus of a laser beam type equipped with an $\alpha$ signal generating means. The x signal generating means outputs $\alpha$ signals proportional to a relative displacement between a movable mirror and a fixed mirror from electrical signals which are obtained by converting, photoelectrically, an interference beam that is a combination of a laser beam reflected on a movable mirror and a laser beam reflected on a fixed mirror, or from electrical signals further from a laser, or from electrical signals produced by converting laser beams photoelectrically. Likewise, a $\beta$ signal generating means that generates $\beta$ signals separately from the aforesaid $\alpha$ signal, and a $(\alpha-\beta)$ signal generating means that generates signals proportional to $(\alpha-\beta)$ from output from both the $\alpha$ signal generating means and the $\beta$ signal generating means are also provided. The second object of the invention can be attained by the second example having the aforesaid structure.

In the movement measuring apparatus of a laser beam type of the invention, there is provided, as a $\beta$ signal generating means, a means generating $\beta$ signals proportional to a relative displacement between a movable mirror and a fixed mirror from electrical signals obtained by converting photoelectrically an interference beam that is a combination of both reflected beams. One is a laser beam from a laser identical to or different from the signal generating means and in parallel with a laser beam from the $\alpha$ signal generating means, reflected on a movable mirror located at a reference position on a mounting base for a movable mirror driving means for the $\alpha$ signal generating means. The other is that reflected on a fixed mirror mounted on a fixed mirror mounting base of the $\alpha$ signal generating means, or from electrical signals further from the laser, or from electrical signals produced by converting laser beams photoelectrically. Output from $(\alpha-\beta)$ signal generating means can provide information of relative displacement between the reference position on the base and the movable mirror on the $\alpha$ signal generating means. Therefore, when a movable mirror driving means on the $\alpha$ signal generating means is driven and controlled based on information mentioned above, a movement of a moving object against the reference position on the base can be controlled accurately. Further, in another embodiment there is provided, as a $\beta$ signal generating means, a means generating $\beta$ signals proportional to the relative displacement between a movable mirror and a fixed mirror from electrical signals obtained by converting photoelectrically an interference beam that is a combination of both reflected beams. One is a laser beam from a laser identical to or different from the $\alpha$ signal generating means reflected in parallel with a laser beam from the $\alpha$ signal generating means, from movable mirror located on a mounting base for a movable mirror for the $\alpha$ signal generating means. The other is reflected from a fixed mirror mounted on a fixed mirror mounting base of the $\alpha$ signal generating means, or from electrical signals further from a laser or from electrical signals obtained by converting photoelectrically a laser beam. Output from $(\alpha-\beta)$ signal generating means can provide information of relative displacement, in the direction parallel with a laser beam, between the $\alpha$ signal generating means fixed on the same mounting base and a movable mirror of the $\beta$ signal generating means (a value obtained by dividing the aforesaid relative displacement with a fixed value; that is a distance from the movable mirror in the direction making a right angle with the laser beam represents a tangent of a rotating angle of the mounting base, and it is mostly the same as a rotating angle in the unit of radian when the distance from the movable mirror is large enough against the relative displacement), namely, the information of a rotating angle of the mounting base for the movable mirror. Therefore, it can be used for measurement of rotation in a small angle of a moving object. Further, in another embodiment using a method wherein $\alpha$ signal outputted from an signal generating means is delayed by a certain period of time, to be outputted as $\beta$ signal as a $\beta$ signal generating means, output from $(\alpha-\beta)$ signal generating means gives constantly the information of displacement in a certain period of time between the movable mirror and the fixed mirror, namely the velocity information. Therefore, it can be used for measurement of velocity change of a moving object. Further, in another embodiment, a personal computer is used as $\beta$ signal generating means, and output from $(\alpha-\beta)$ signal generating means gives information of difference between a displacement of a movable mirror against a fixed mirror and a value indicated by the personal computer. Therefore, it is possible to control the programmed movement of a moving object if a means for driving a movable mirror is controlled, based on the information mentioned above.

DETAILED DESCRIPTION OF THE INVENTION

The first example of the invention will be explained as follows, referring also to FIG. 1 through FIG. 9.

Figure 1:
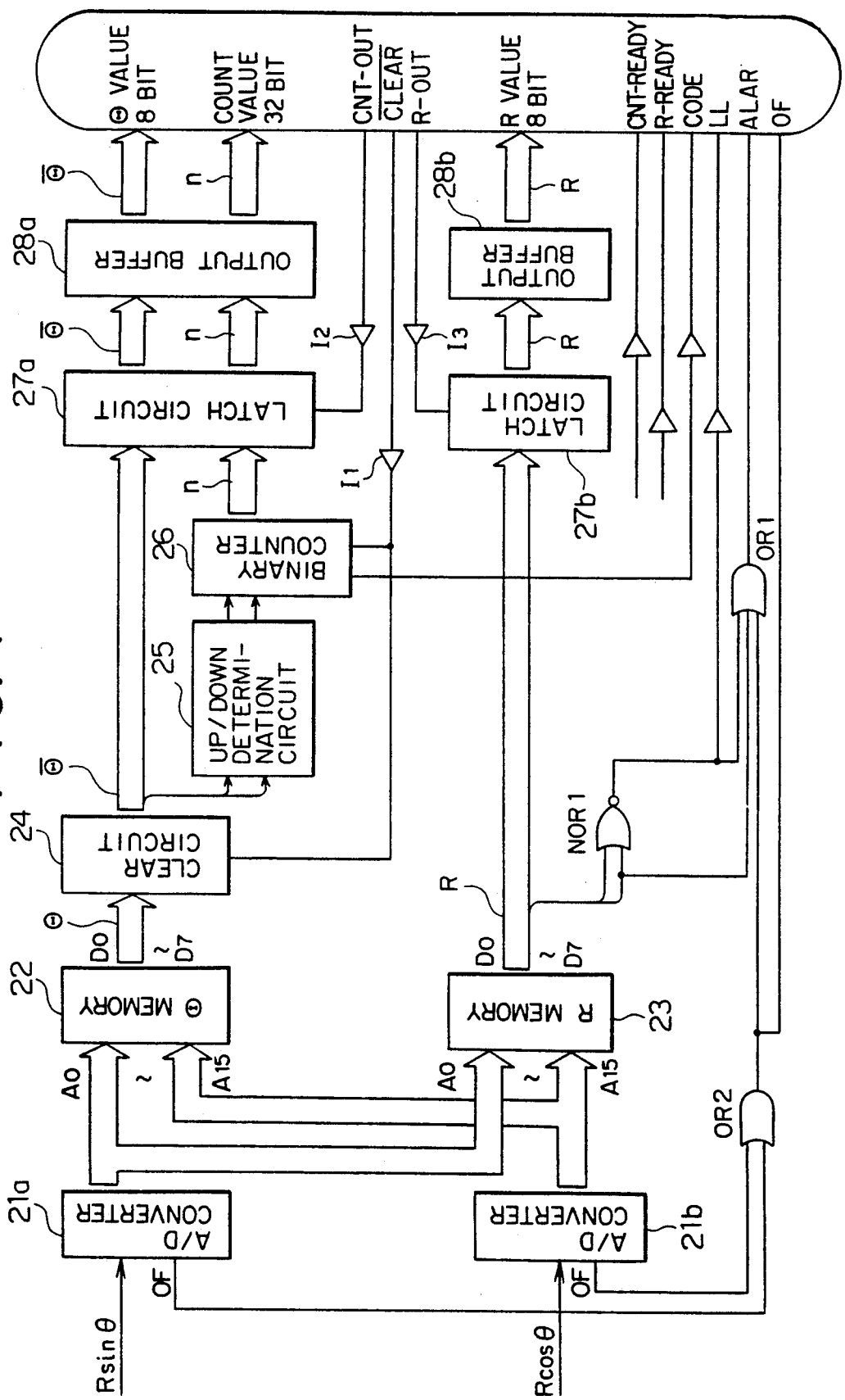
FIG. 1 is a block diagram showing an example of a signal processing circuit.
Figure 2:
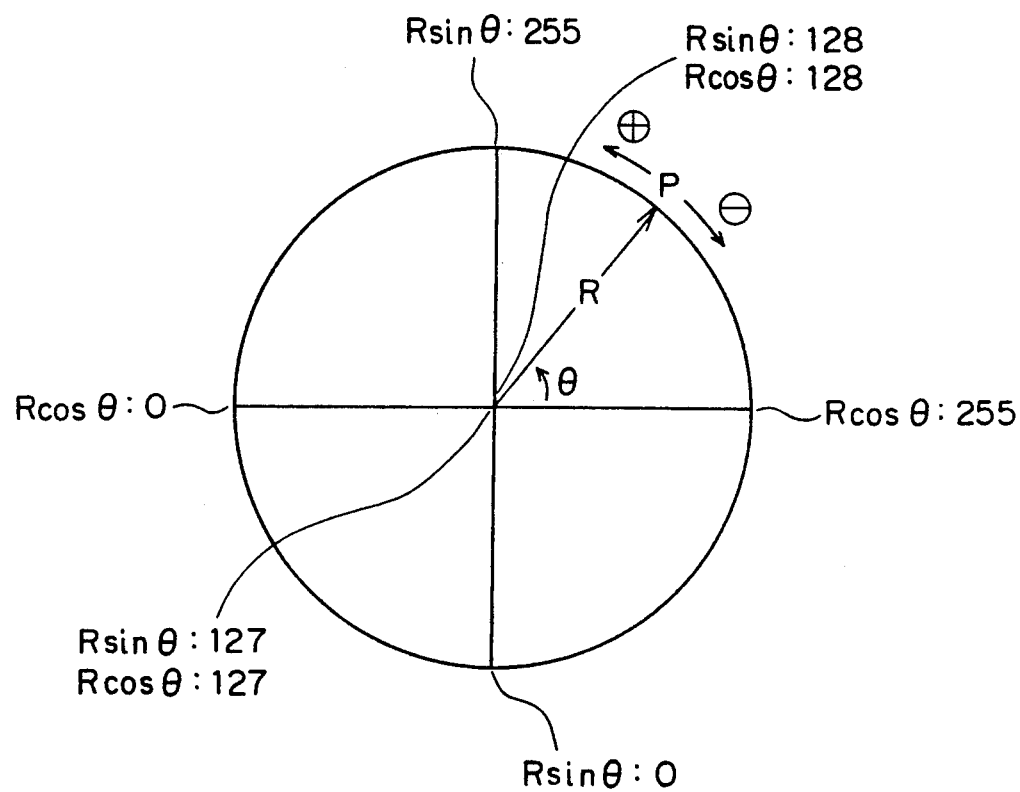
FIG. 2 represents a Lissajous' graph of R $\sin\theta$ and R $\cos\theta$.
Figure 8:
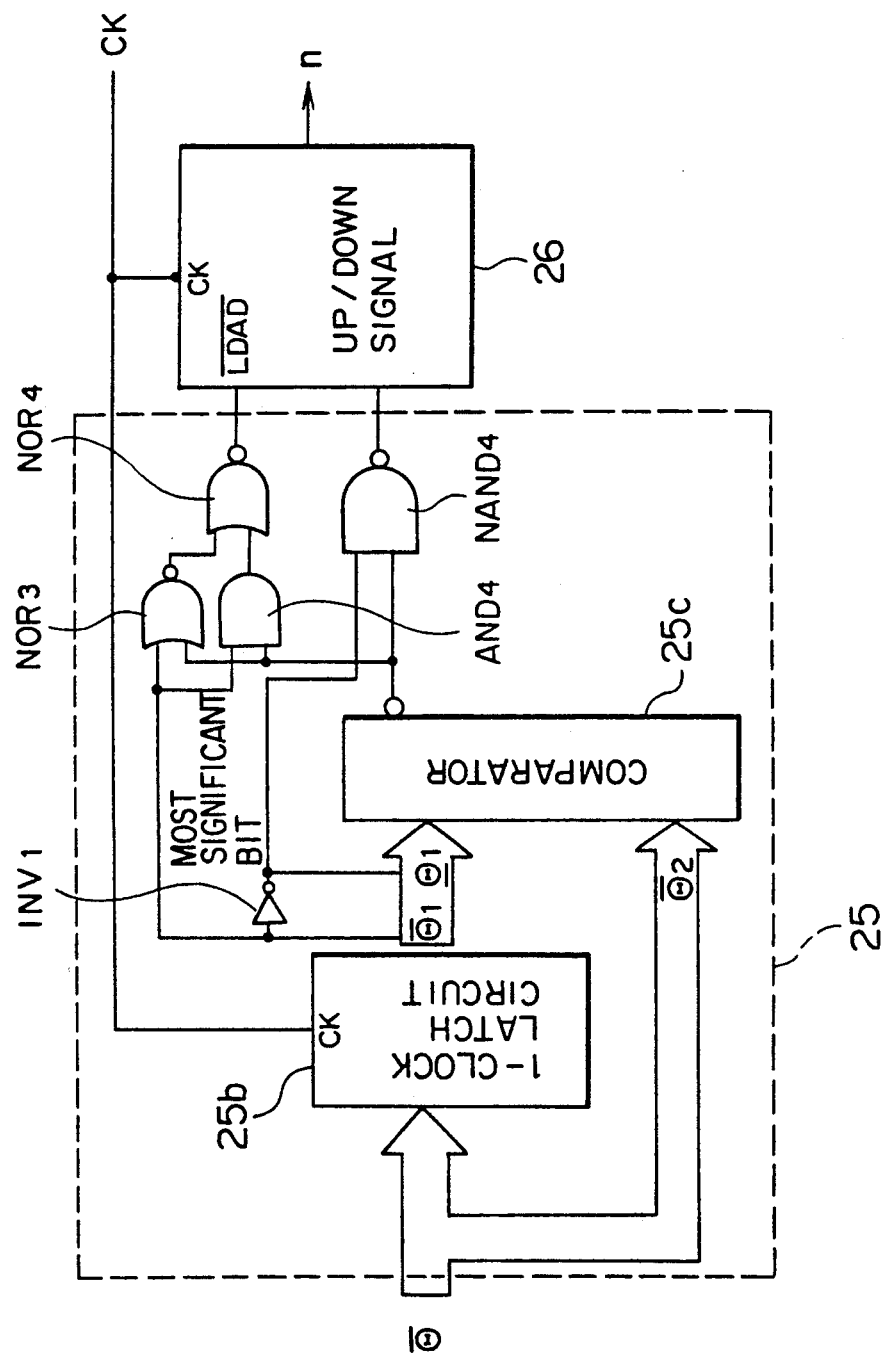

In FIG. 1, each of 21a and 21b is an A/D converter for digital-converting R $\sin\theta$ and R $\cos\theta$ identical to that in FIG. 8. For this purpose, and by example only, the A/D converters 21a, 21b are of the type for converting to digital signals having a construction of 8 bits or more. In this connection, on condition that R $\sin\theta$, R $\cos\theta$ and even $\theta$ are indicated with 8 bits, even when $\theta$ of $0 \leq \theta < 2\pi$ in Lissajous' graph in FIG. 2 is indicated with 8 bits to cope with the fastest change speed of $\alpha$, Least Significant Bit (LSB) of $\theta$ becomes $2\pi/256$. Namely, it is possible to obtain $\theta$ with high accuracy of a minute unit satisfactory enough for the purpose of almost all displacement meters, with R $\sin\theta$, R $\cos\theta$ and $\theta$ all indicated with 8 bits. When $\theta$ of $0 \leq \theta < 2\pi$ is indicated with the same bit numbers as those for R $\sin\theta$ and R $\cos\theta$, $\theta$ can be obtained with accuracy of unit of LSB of $\theta$, even when an amplitude of R $\sin\theta$ and R $\cos\theta$ is decreased down to half its value. However when $\theta$ only is indicated with a higher number of bits, actual unit accuracy of obtained $\theta$ tends to be rougher than LSB of $\theta$. Therefore, it is preferable to indicate R $\sin\theta$, R $\cos\theta$ and $\theta$ of $0 \leq \theta < 2\pi$ with the same bit number.

Figure 3:
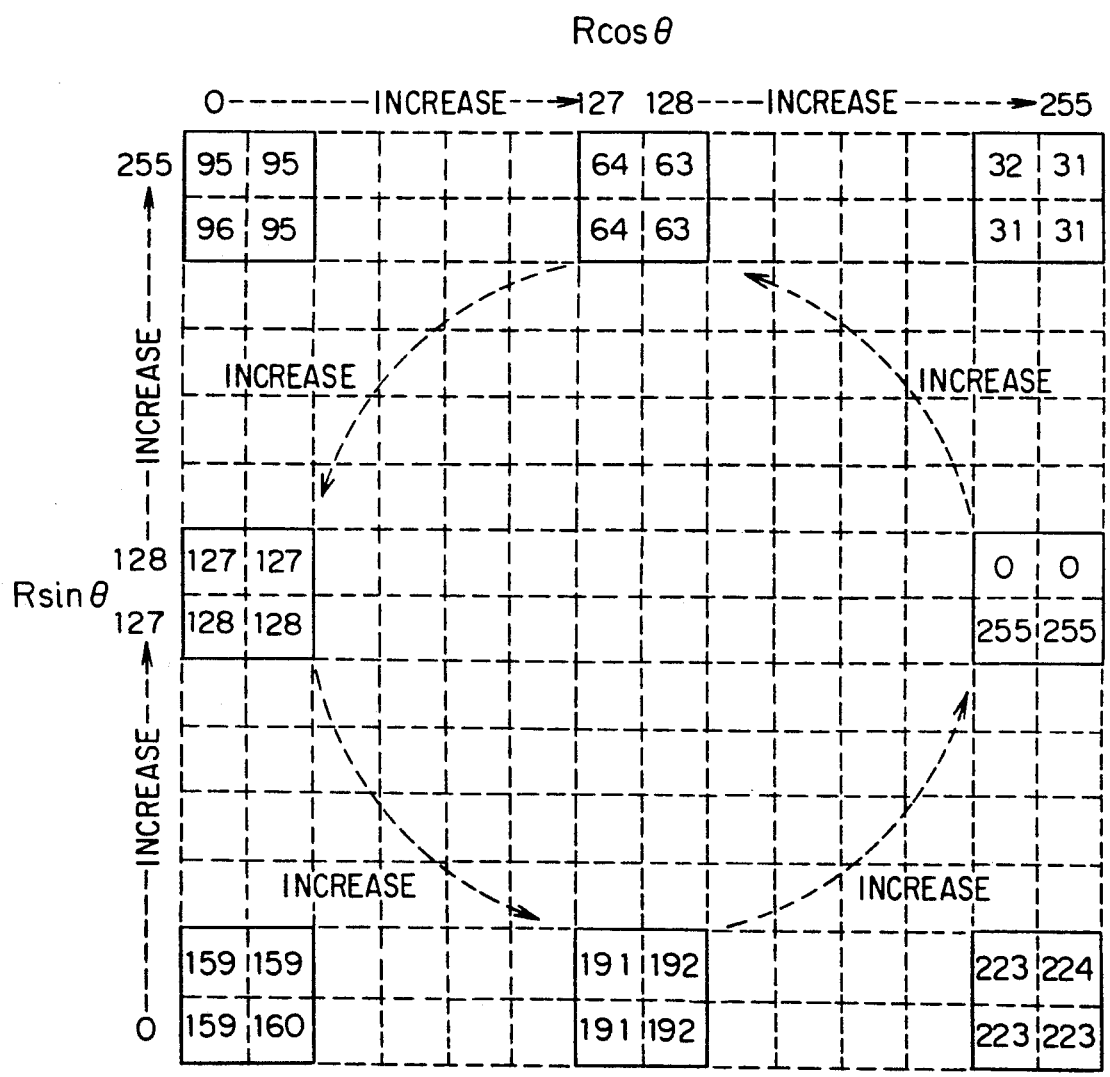
FIGS. 3 and 4 represent memory graphs showing examples of memory contents of $\Theta$ memory and R memory, respectively.

The numeral 22 is a memory means containing the value of $\theta$, i.e., $\Theta$ memory. Values for the $\Theta$ memory, obtained through equation (3) or (1) from combinations of digital signals of various R $\sin\theta$ and R $\cos\theta$, varying according to the change of $\theta$ from 0 to $2\pi$, are stored so that these values may be read by digital signals of R $\sin\theta$ and R $\cos\theta$. A memory graph in FIG. 3 shows an example of $\Theta$ memory wherein $\Theta$ values indicated with 8 bits from $\theta$, corresponding to $0 \leq \theta < 2\pi$, are stored in addresses designated by R $\sin\theta$ and R $\cos\theta$ in a way that the $\Theta$ values increase gradually counterclockwise at the center of memory graph, similarly to the Lissajous' graph in FIG. 2. Without being limited to this example, $\Theta$ memory 22 may be the one wherein $\Theta$ values indicated with a bit number other than 8 bits are stored, or the one wherein the values of R $\sin\theta$ and R $\cos\theta$ are not arranged in sequence in terms of their sizes.

Figure 4:
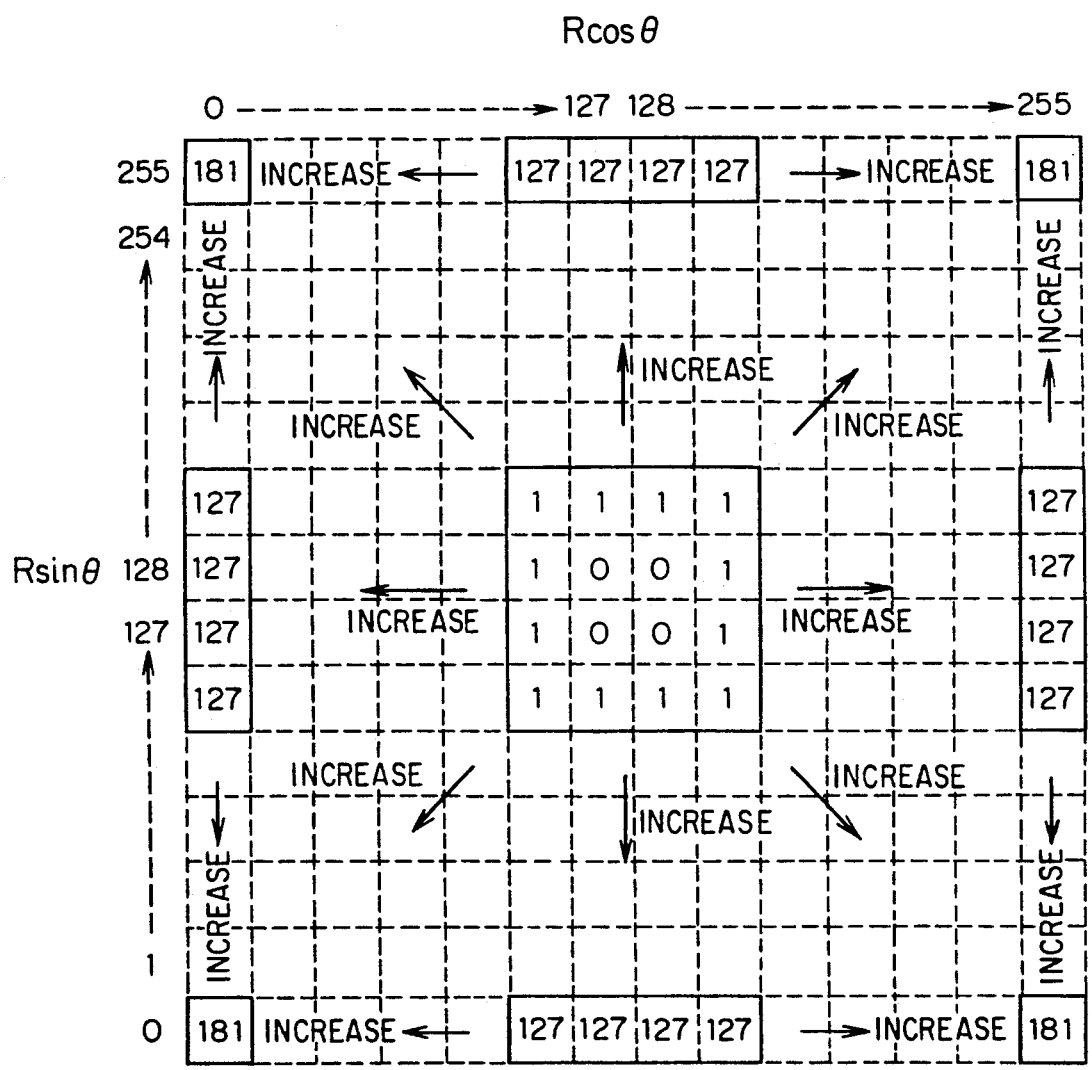

In the same manner as $\Theta$ memory 22, the numeral 23 is an R memory wherein digital values of R obtained through equation (4) or equation (2) from various combinations of digital signals of R $\sin\theta$ and R $\cos\theta$ are stored in advance so that the digital values may be read by digital signals of R $\sin\theta$ and R $\cos\theta$. A memory graph in FIG. 4 shows an example of R memory 23 wherein R values indicated with 8-bit are stored in addresses designated with 8-bit R $\sin\theta$ and R $\cos\theta$ in a way that the R values increase gradually as they radiate from the center of the memory graph, similarly to a Lissajous' graph in FIG. 2. The R memory 23 is not naturally limited to this example, that is, R values may be indicated with a bit number other than 8-bit, and values of R $\sin\theta$ and R $\cos\theta$ do not necessarily need to be arranged in sequence in terms of their sizes. In this example, when R values exceed 127, it indicates that R $\sin\theta$ or R $\cos\theta$ is overflowing, that is, exceeding a range of 8-bit of A/D conversion.

Figure 5:
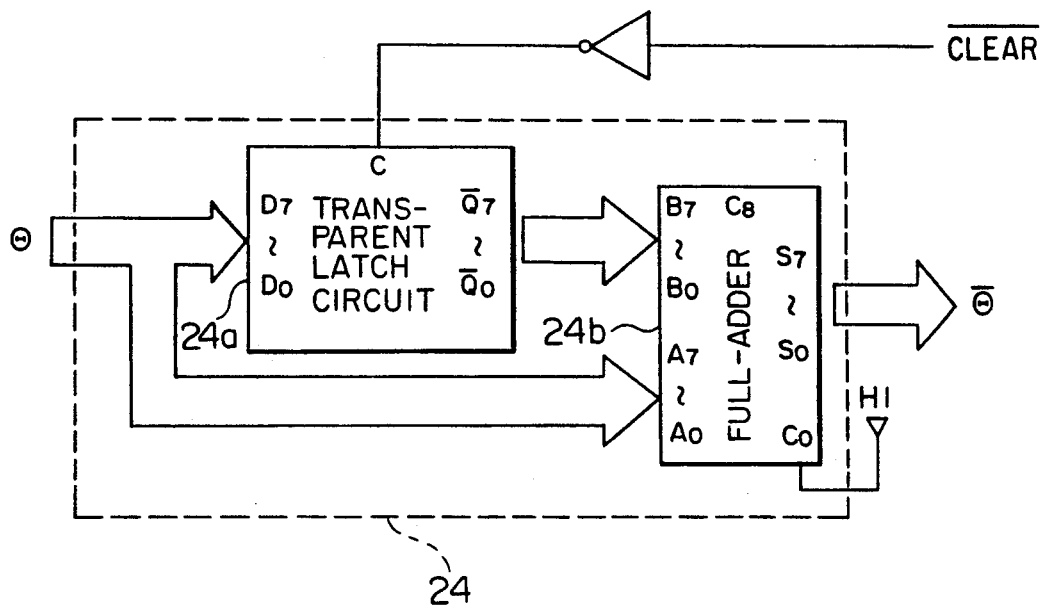
FIG. 5 is a block diagram showing an example of a clear circuit.

The numeral 24 is a CLEAR circuit which converts $\Theta$ values read from $\Theta$ memory 22 to $\Theta$ values changing from 0 of origin $\Theta$ value to the $\oplus$ direction or to the $\ominus$ direction of a Lissajous' graph in FIG. 2, and then outputs them. The CLEAR circuit is composed of TRANSPARENT LATCH circuit 24a and FULL-ADDER 24b, as shown in FIG. 5. The TRANSPARENT LATCH circuit 24a, when $\overline{\text{CLEAR}}$ signals are in a low level of 0, constantly outputs complements of $\Theta$ values from $\Theta$ memory 22. When $\overline{\text{CLEAR}}$ values are changed to a high level of 1, the TRANSPARENT LATCH circuit 24a latches complements at that time and outputs them. The FULL-ADDER 24b outputs $\Theta$ values, which are the result of the addition of $\Theta$ values from the $\Theta$ memory 22, complements from the TRANSPARENT LATCH circuit 24a and lowest CARRY-IN (High). Namely, when a $\overline{\text{CLEAR}}$ signal is 0; the $\Theta$ value is always 0, and when the $\overline{\text{CLEAR}}$ signal changes to 1, the difference between the outputted $\Theta$ value from the $\Theta$ memory 22 at the time of changing to 1 and the output $\Theta$ value thereafter is given.

The numeral 25 is an UP/DOWN DETERMINATION circuit to count the number n of $\Theta$ revolving that determines whether the $\Theta$ value generated from the CLEAR circuit 24 changes from increase to decrease or from decrease to increase. For this purpose, those circuits having the structure shown in FIG. 6 or FIG. 8 are used.

Figure 6:
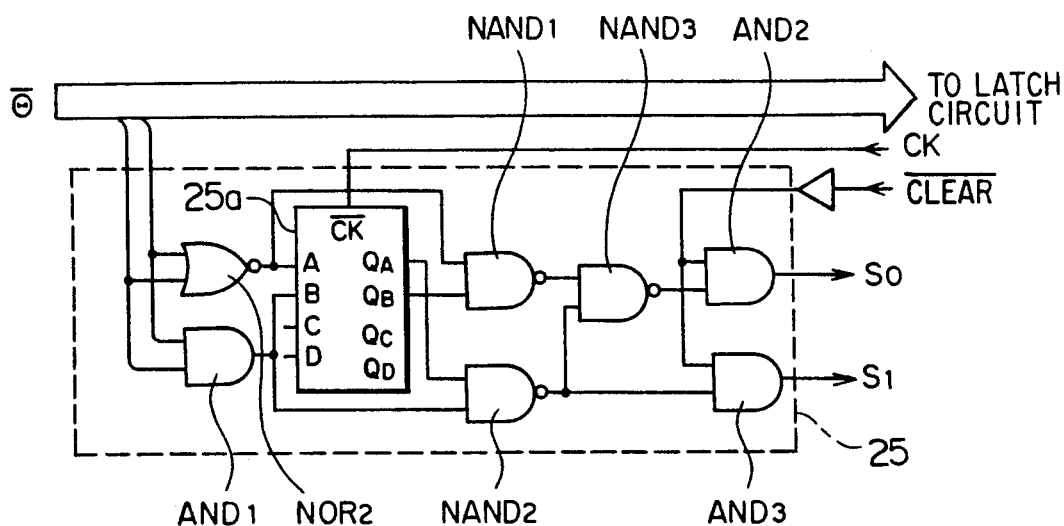
FIG. 6 and FIG. 8 represent block circuit diagrams showing examples of up/down discrimination circuits.

When an output value from CLEAR circuit 24 is designated as $\Theta_1$ and an output value by means of the following clock is designated as $\Theta_2$ and when MSB and MSB-1, each representing first two bits of $\Theta_1$ and $\Theta_2$, show the relation shown in the truth value table of Table 1, the UP/DOWN DETERMINATION circuit 25 shown in FIG. 6 outputs the signals shown in the same row by AND gates AND2 and AND3 as counter control signals $S_0$ and $S_1$.

TABLE 1

| Clear signals | $\Theta_1$ MSB | $\Theta_1$ MSB-1 | $\Theta_2$ MSB | $\Theta_2$ MSB-1 | Counter control signals $S_0$ | Counter control signals $S_1$ | Binary counter |
|---|---|---|---|---|---|---|---|
| 1 | 0 | 0 | 1 | 1 | 1 | 0 | Down count |
| 1 | 1 | 1 | 0 | 0 | 1 | 1 | Up count |
| 1 | 0 | 1 | X | X | 0 | 1 | Load |
| 1 | 1 | 0 | X | X | 0 | 1 | Load |
| 1 | X | X | 0 | 1 | 0 | 1 | Load |
| 1 | X | X | 1 | 0 | 0 | 1 | Load |
| 0 | X | X | X | X | 0 | 0 | Clear |

X: don't care

With regard to the uppermost row in Table 1, when both MSB and MSB-1 of $\Theta_1$ are 0, NOR2 of NOR gate outputs 1 and AND1 of AND gate outputs 0 respectively to 1-CLOCK LATCH circuit 25a. The 1-CLOCK LATCH circuit 25a, when receiving output from NOR2 and AND1 concerning the following $\Theta_2$, outputs 1 of the output from NOR2, received previously to NAND2 of NAND gate, and outputs 0 of the output from AND1 to NAND1 of NAND gate, respectively. To NAND1 and NAND2, 0 of the output from NOR2 and also 1 of the output from AND1, both being caused by MSB and MSB-1 of $\Theta_2$ representing 1, are inputted respectively. Thereby, NAND1 outputs 1 and NAND2 outputs 0. NAND3 of NAND gate to which both output are inputted outputs 1 to AND2 of AND gate. The value 0 of the output of NAND2 is inputted also to AND3. Since 1 of $\overline{\text{CLEAR}}$ signals is also inputted in AND2 and AND3, AND2 outputs 1 as $S_0$ and AND3 outputs 0 as $S_1$. With regard to the row second from the top and thereafter in Table 1, they can be explained likewise, and when MSB and MSB-1 of $\Theta_1$ are 0 and 1 or 1 and 0, respectively, and MSB and MSB-1 of $\Theta_2$ are 0 and 1 or 1 and 0 respectively, $S_0$ and $S_1$ are constantly 0 and 1, respectively. When $\overline{\text{CLEAR}}$ signal is 0, both $S_0$ and $S_1$ are 0. The $\overline{\text{CLEAR}}$ signal is not limited to be the same as one inputted in the $\overline{\text{CLEAR}}$ circuit 24, and it may be another one. The values 0 and 0 of the counter control signals $S_0$ and $S_1$ are led to clear binary counter 26 to be 0, 1 and 1 are for up count, 1 and 0 are for down-count, and 0 and 1 are for loads which short-cut input and output in parallel of binary counter 26 so that it does not count.

Figure 7A:
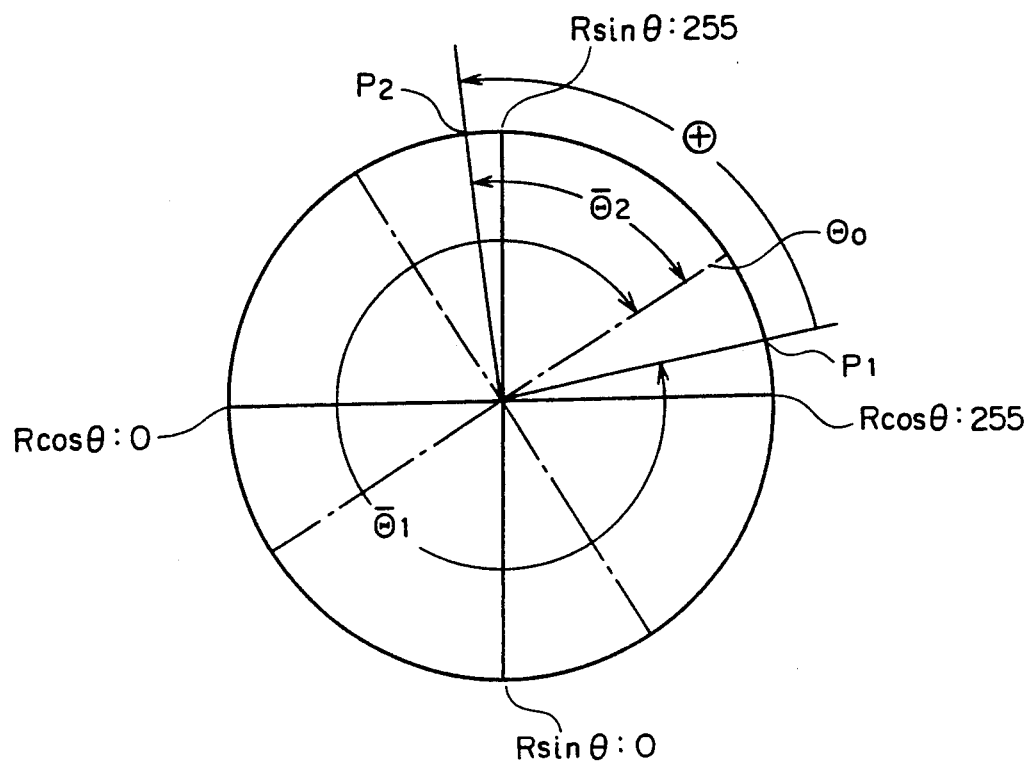
FIGS 7(A) and 7(B) and FIGS 9(A) and 9(B) are Lissajous' graphs for illustrating functions of discriminating circuits in FIG. 6 and FIG. 8, respectively.
Figure 7B:
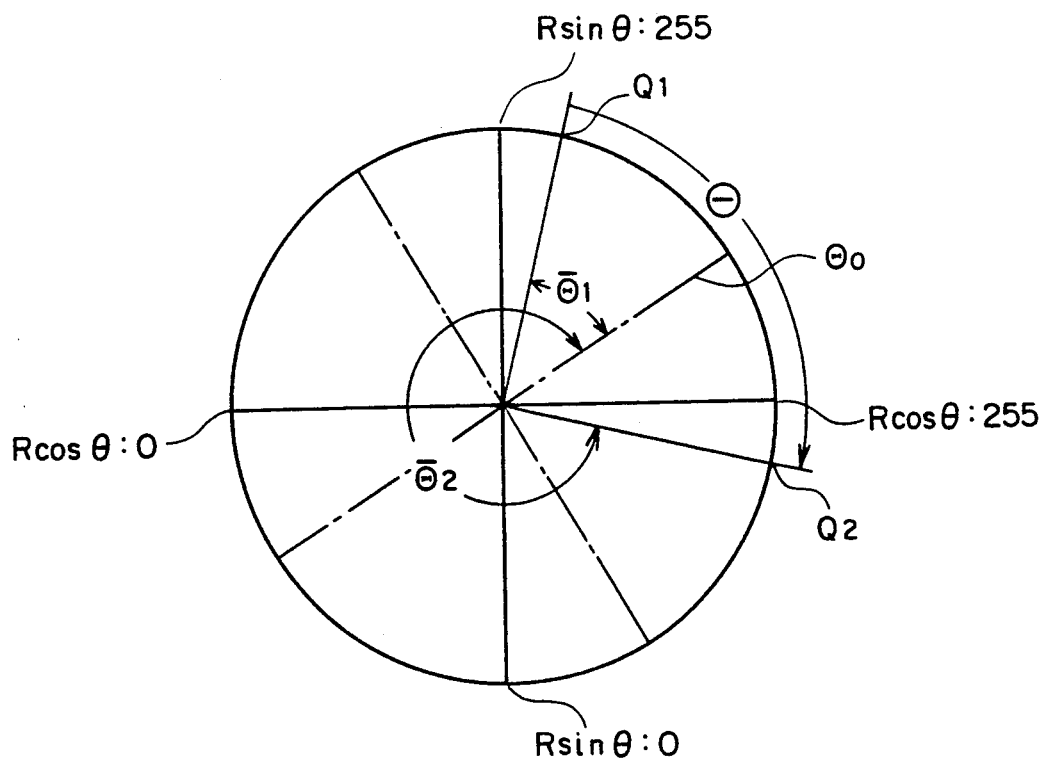

The determination circuit 25 in FIG. 6 stores $\Theta$ values wherein $\Theta$ memory 22 represents $2\pi$ under 8 bits, and therefore it determines, under the conditions that 1 count of the binary counter 26 corresponds to $2\pi$, an interval of $\Theta$ values read successively. Namely the difference between $\Theta_1$ and $\Theta_2$ corresponds constantly to $\pi/2$ or less, where $\Theta$ has exceeded 0 in the change in the $\oplus$ direction from $P_1$ to $P_2$ if $\Theta_1$ is in the fourth quadrant and $\Theta_2$ is in the first quadrant as shown in FIG. 7(A), and that $\Theta$ has exceeded 0 in the change in $\ominus$ direction from $Q_1$ to $Q_2$ if $\Theta_1$ is in the first quadrant and $\Theta_2$ is in the fourth quadrant, as shown in FIG. 7(B). In this case, therefore, the frequency of $R \sin\theta$ and $R \cos\theta$, namely, the change speed of $\alpha$ needs to be one quarter or less of the frequency of clock (CK) that reads $\Theta$ values, for the purpose of determination.

Figure 9A:
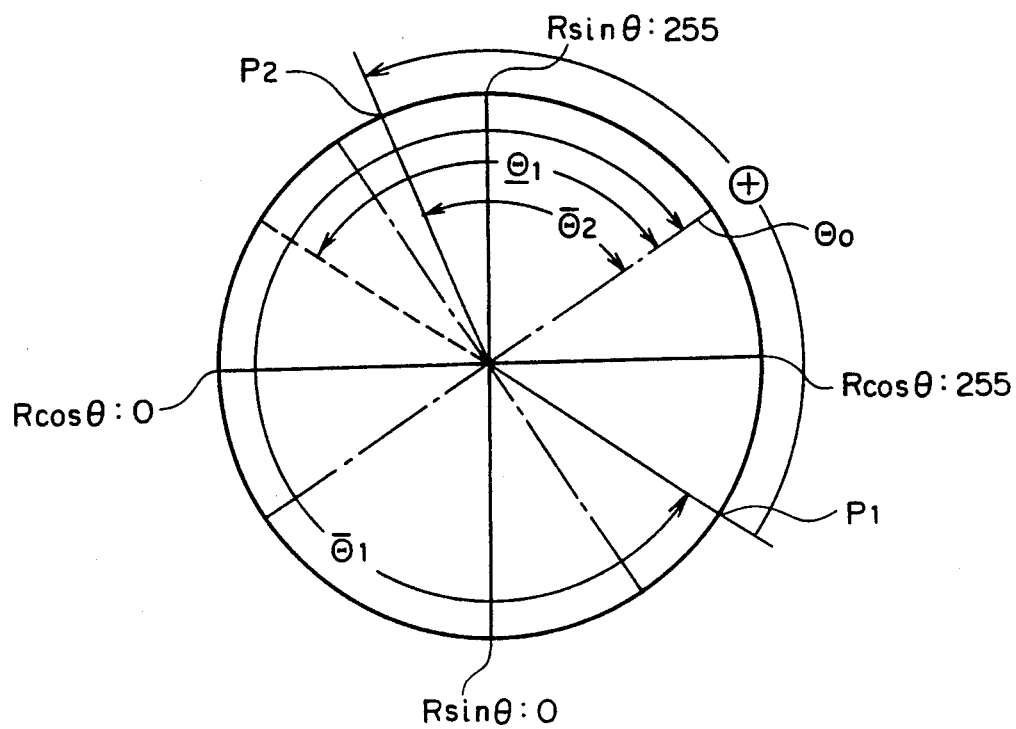
Figure 9B:
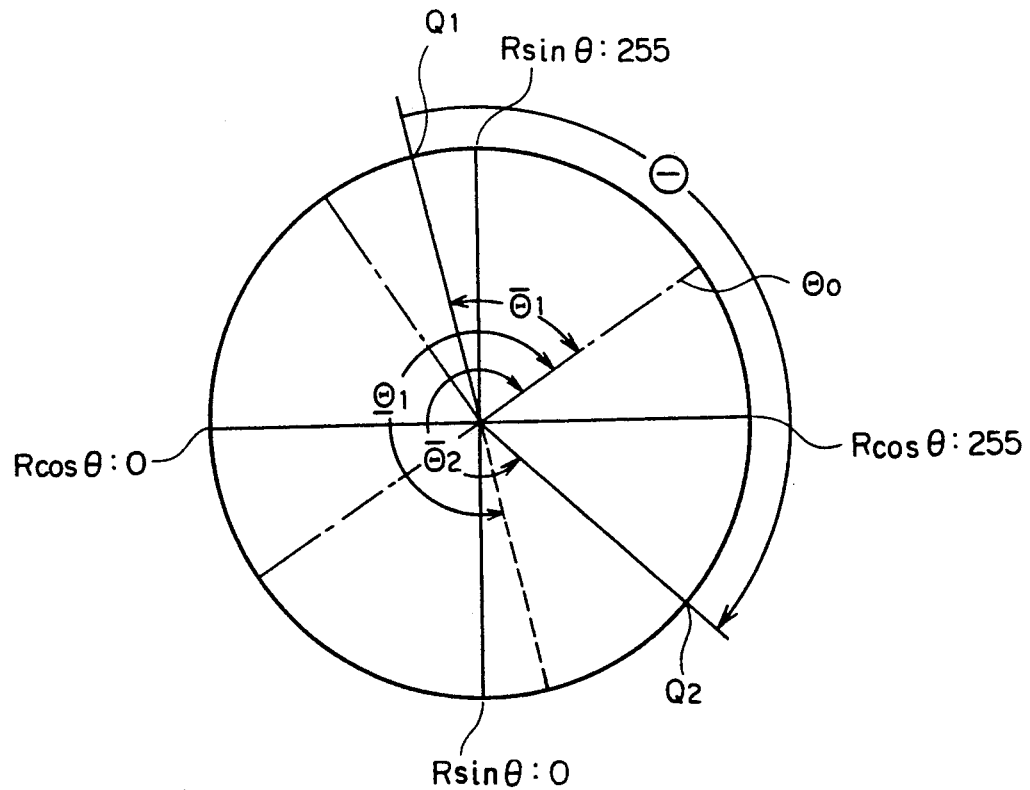
Figure 10:
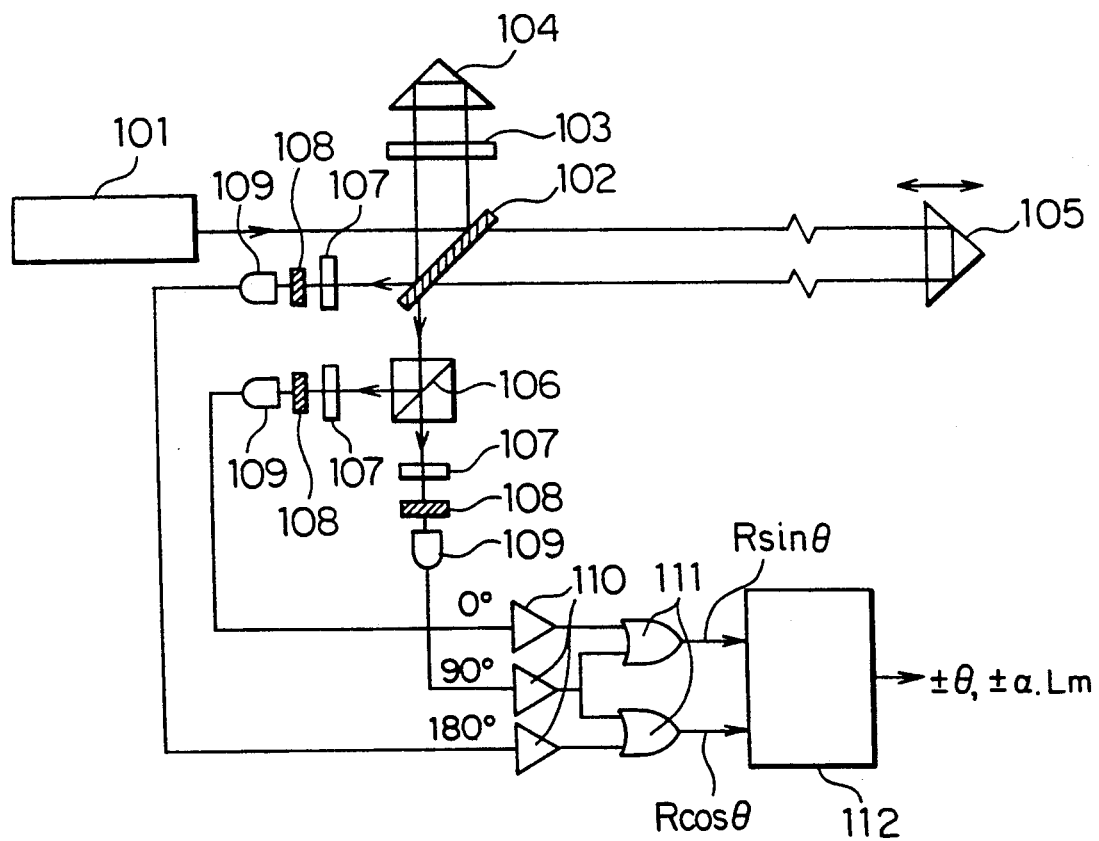
FIG. 10 is a schematic structural diagram showing an example of a displacement meter.

The UP/DOWN DETERMINATION circuit 25 in FIG. 8, under the condition that the difference between $\Theta_1$ and $\Theta_2$ is constantly $\pi$ or less, determines that $\Theta$ has exceeded 0 in the change in the $\oplus$ direction from $P_1$ to $P_2$ if $\Theta_1$ is in the fourth or third quadrant and $\Theta_2$ is smaller than $\Theta_1$, i.e., that is a phase difference between $\Theta_1$ and $\pi$ as shown in FIG. 9(A). Likewise it determines that $\Theta$ has exceeded 0 in the change in the $\ominus$ direction from $Q_1$ to $Q_2$ if $\Theta_1$ is in the first or second quadrant and $\Theta_2$ is greater than $\Theta_1$, as shown in FIG. 9(B), so that determination may be carried out even when the frequency of $R \sin\theta$ and $R \cos\theta$ is twice the frequency in the foregoing. Operations of the determination circuit 25 will be explained as follows, referring also to the truth value table in Table 2.

TABLE 2

| $\Theta_1$ | | $\Theta_1$ | $\Theta_2 > \Theta_1$ YES = 1, | Counter control signals | | Binary |
|---|---|---|---|---|---|---|
| MSB | MSB-1 | MSB | No = 0 | Up/down | LOAD | counter |
| o | o | 1 | o | 1 | o | Load |
| o | o | 1 | 1 | o | 1 | Down count |
| o | 1 | 1 | o | 1 | o | Load |
| o | 1 | 1 | 1 | o | 1 | Down count |
| 1 | o | o | o | 1 | 1 | Up count |
| 1 | o | o | 1 | 1 | o | Load |
| 1 | 1 | o | o | 1 | 1 | Up count |

TABLE 2-continued

| $\Theta_1$ | | $\Theta_1$ | $\Theta_2 > \Theta_1$ YES = 1, | Counter control signals | | Binary |
|---|---|---|---|---|---|---|
| MSB | MSB-1 | MSB | No = 0 | Up/down | LOAD | counter |
| 1 | 1 | o | 1 | 1 | o | Load |

The 1-CLOCK LATCH circuit 25b in FIG. 8 outputs $\Theta_1$ when $\Theta_2$ is inputted therein, and the following clock after $\Theta_1$ is inputted therein. Most significant Bit (MSB) of the $\Theta_1$ are inputted in OR3 of NOR gate and in AND4 of AND gate, and concurrently with that, reversed by INV1 of an inverter and returns to the output of 1-CLOCK LATCH circuit 25b to convert $\Theta_1$ to $\overline{\Theta_1}$ resultantly. These $\Theta_1$ and $\Theta_2$ are inputted in comparator 25c, and the comparator 25c outputs signals of 1 in YES of $\Theta_2 > \Theta_1$, shown in Table 2, or 0 in NO of $\Theta_1 > \Theta_1$ to NOR3, AND4 and NAND4 of NAND gate. In NAND4, signals reversed from MSB of $\Theta_1$ are also inputted from INV1. Therefore, when $\Theta_1$ is in the first or the second quadrant, MSB of $\Theta_1$ is 0, as shown in rows 1 through 4 in Table 2 and MSB of $\overline{\Theta_1}$, that is reversed MSB of $\Theta_1$, is 1. When $\Theta_1 > \Theta_1$ is 0, as shown in rows 1 and 3 in Table 2, input of NAND4 is 1 and 0. Therefore, an up/down signal of an output is 1, and an output is 1 with input of 0 and 0 for NOR3, and an output is 0 with input of 0 and 0 for AND4, resulting in 0 for $\overline{\text{LOAD}}$ signal of output of NOR4 of NOR gate. On the other hand, when $\Theta_2 > \Theta_1$ is 1, as shown in columns 2 and 4 in Table 2, input of NAND4 becomes 1 and 1. Therefore, an up/down signal is 0 and an output is 0 with input of 0 and 1 for NOR3, and an output is 0 with input of 0 and 1 for AND4, resulting accordingly in $\overline{\text{LOAD}}$ signal of 1. When $\Theta_1$ represents values in the third or fourth quadrant, MSB of $\Theta_1$ becomes 0, and when $\Theta_2 > \Theta_1$ is 0 as shown in the columns 5 and 7 in Table 2, input of NAND4 becomes 0 and 0. Therefore, an up/down signal of an output becomes 1, and an output is 0 with input of 1 and 0 for NOR3 and an output is 0 with input of 1 and 0 for AND4, resulting in $\overline{\text{LOAD}}$ signal of 1 in terms of output of NOR4. When $\Theta_2 > \Theta_1$, on the other hand, is 1 as shown in columns 6 and 8 in Table 2, an input of NAND4 becomes 1 and 0. Therefore, an up/down signal is 1 and an output is 0 with input of 1 and 1 for NOR3, and an output is 1 with input of 1 and 1 for AND4, resulting in $\overline{\text{LOAD}}$ signal of 0. Thereby, counter control signal in Table 2 are obtained, and a combination of the up/down signals and $\overline{\text{LOAD}}$ signals of 1 and 1 causes binary counter 26 to up-count, and a combination of 0 and 1 causes it to down-count, and a combination of 1 and 0 is a load that short-cuts input and output in parallel for the binary counter 26 so that it does not count.

Incidentally, since it is important that the up/down determination circuit 25 outputs stable counter control signals to the binary counter 26, it is preferable to cause 1-CLOCK LATCH circuits 25a and 25b in FIGS. 6 and 8 to function at the time of a rise of CK signals and to cause the binary counter 26 to function at the time of a fall thereof. Further, in the binary counter 26, LSB of count value n corresponds to the one that is greater by one bit than MSB $\Theta$ value. Therefore, $\theta = 2n\pi + \Theta$ is displayed with n and $\Theta$ value in parallel.

Returning to FIG. 1, the numeral 27a refers to a latch circuit that holds $\Theta$ values of an output of CLEAR circuit 24 and count value of n of the binary counter 26; the numeral 27b refers to a latch circuit that holds R values of an output of R memory 23; the numeral 28a refers to an output buffer that outputs Θ values and n values held in the latch circuit 27a; the numeral 28b refers to an output buffer that outputs R values held in the latch circuit 27b; I₁–I₃ represent buffers; OR1 and OR2 represent OR gates; and NOR1 refers to a NOR gate. From n values and Θ values both outputted from the output buffer 28a, θ can be obtained as described above.

In the illustrated example, when upper two bits of R value outputted from R memory 23 are 0, alarm signals ALARM are outputted through NOR1 and OR1 for warning to avoid an occasion that the accuracy of θ to be obtained is lowered by the amplitude of R sinθ and R cosθ that varies to be shortened. Further, even when an amplitude of R sinθ and R cosθ is increased to exceed the maximum allowable value for A/D converters 21a and 21b, overflow signals OF are outputted from A/D converters 21a and 21b and ALARM is outputted through OR2 and OR1 for warning. Furthermore, even when MSB of an R value outputted from R memory 23 becomes 1, ALARM is outputted through OR1 for warning, because of the substantial overflow of R sinθ and R cosθ as in the case explained earlier.

Concrete examples will further be explained as follows.

For A/D converters 21a and 21b, MP-7684 with 8-bit construction made by Micropowers System Inc. was used, and Θ memory 22 and R memory 23, MB81C84A-45 of 64 K-byte and SRAM memory of 45 nsec made by Fujitsu Inc. was used. The expense for this was one quarter of the expense for the occasion employing a CPU. In Θ memory 22, wherein $0 \leq \theta < 2\pi$ is expressed through 8-bits, Θ values were stored. A/D converters 21a and 21b with a switching capacitor system were driven with 13 MHz, and 8-bit Θ values and R values were obtained from Θ memory 22 and R memory 23, respectively, during the processing time of 13 MHz. The resolving power of 8-bit Θ values was $2\pi/256$, provided that upper two bits of R values did not take the value of 0 at the same time. For each of CLEAR circuit 24 and latch circuit 27a located downstream, an IC composed of 4 TTLs of a high-speed type was used. This showed clear function surely for the change of 16 MHz values. Up/down control circuit 25 was made to be of a structure shown in FIG. 6, and an IC for counter use was used for 1-CLOCK LATCH circuit 25a. For the binary counter 26, 74AS869 was used. Owing to this, up/down was determined without any problem and n was counted under the CK frequency of 16 MHz. This can follow the speed of change up to 4 MHz of R sinθ and R cosθ. The same condition as in the foregoing was shown in the occasion wherein two D latch circuits were connected as 1-CLOCK LATCH circuit 25a in series. UP/DOWN DETERMINATION circuit 25 was made to be of a structure shown in FIG. 8, 1 clock latch circuit 25b was prepared with the same one as in 25a and 74F686 was used for comparator 25c. For the binary counter 26, 74F669 of a counter array type was used. Owing to this, it was possible to determine up/down and count n at the CK frequency of 16 MHz, similarly to the foregoing. This can follow the speed of change up to 8 MHz for the phase change of π of R sinθ and R cosθ. This may apply equally to the one wherein comparator 25c employs both 1-CLOCK LATCH circuit and D latch circuit for reversing the output, and subtraction is made by 74F283 similarly to a CLEAR circuit, and carry C8 is monitored.

UP/DOWN DETERMINATION circuit 25, shown in FIGS. 6 and 8, is a logic unit which is very efficient for incorporation in a programmable array logic (PAL) and can be incorporated in one PAL, when one ordinarily requires three TTLs of a high-speed type. Therefore, it is possible to realize a small unit and electric power saving. It is further possible to attain a smaller unit, more saving of electric power and high reliablity, as well when down streams from A/D converters 21a and 21b are changed to be of an LCA type.

In the signal processing circuit mentioned above, all circuits were able to be driven stably under 13 MHz, and it was possible to obtain θ with a phase resolving power of $2\pi/256$. When compared with a conventional displacement meter wherein the processing speed is about 2 MHz, at best, and the highest phase resolving power is about $2\pi/127$, the speed of signal processing in the invention is at least six times higher or and accuracy is at least twice higher. Further, in the signal processing circuit of the example, only a gain adjustment is made for input signals, and other analog circuits are never included. Therefore, non-linearity of phase count value never occurs electrically, and this is an excellent effect which has never been shown in a conventional method.

In the displacement meter of the invention, signals of R sinθ and R cosθ obtained from the displacement of a moving object are not calculation-processed on a real time basis for obtaining θ, which is different from a conventional displacement meter. Instead, signals of R sinθ and R cosθ are used for reading the corresponding Θ value from a memory, wherein Θ values which are digital values of θ for $0 \leq \theta < 2\pi$ are stored in advance. In addition, a means capable of determining the direction for Θ value to exceed 0, even when it does not become 0, and of counting based on the determination is used as an up/down determination count means for Θ values. Therefore, it is possible to obtain θ at high speed and in high accuracy, coping with a high speed of change of α, and a signal processing circuit can be made inexpensive and compact, resulting in less electric power consumption, which is an excellent effect.

Figure 17:
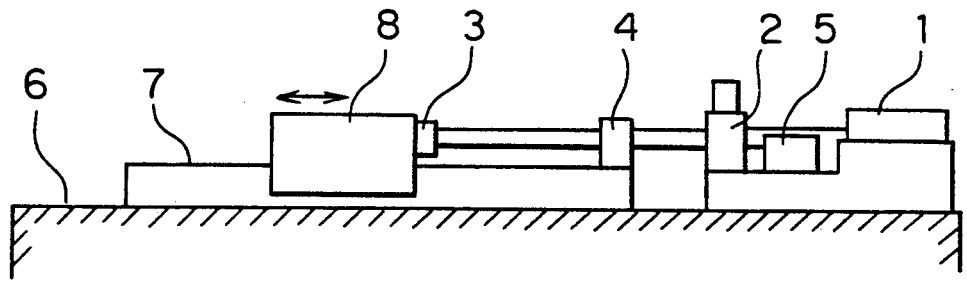
FIGS. 17 and 18 are a schematic side view and a top view respectively showing an example of a movement control apparatus employing a conventional movement measuring device of a laser beam type.
Figure 18:
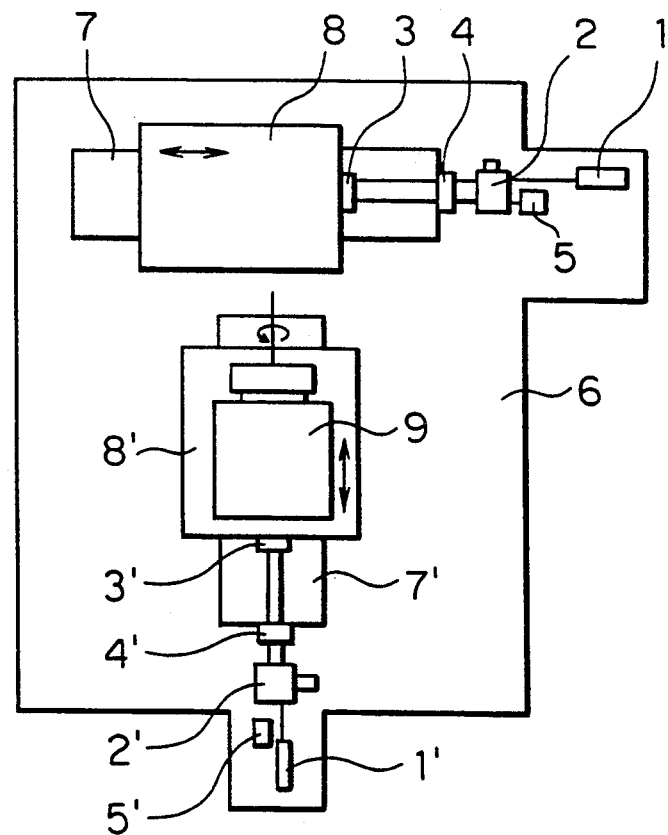

The second example of the invention will be explained as follows, referring to FIGS. 11 through 15. These drawings shows examples of a displacement meter in hetero-dyne system, but the invention is not limited to a hetero-dyne type. The invention also includes an apparatus of fringe-count type. In these drawings, the numeral 1 refers to a two-frequency laser used in common for an α-signal-generating means and a β-signal-generating means; 1 refers to a half-mirror that splits a laser beam from two-frequency laser 1 into an optical path for the α-signal-generating means and an optical path for the β-signal-generating means; 11 refers to a mirror for causing the optical paths for the β-signal-generating means and the α-signal-generating means to be in parallel each other; 2α, 3α, 4α and 5α refer to a polarization beam splitter for the α-signal-generating means, a movable mirror, a fixed mirror, and a receiver, respectively; 2β, 3β, 4β and 5β refer to a polarization beam splitter for the β-signal-generating means, a movable mirror, a fixed mirror and a receiver, respectively. Two-frequency laser 1, polarization beam splitter 2α, movable mirror 3α, fixed mirror 4α and receiver 5α are respectively positioned similarly to two-frequency laser 1, polarization beam splitter 2, movable mirror 3, fixed mirror 4, and receiver 5, as seen in FIGS. 17 and 18.

Figure 11:
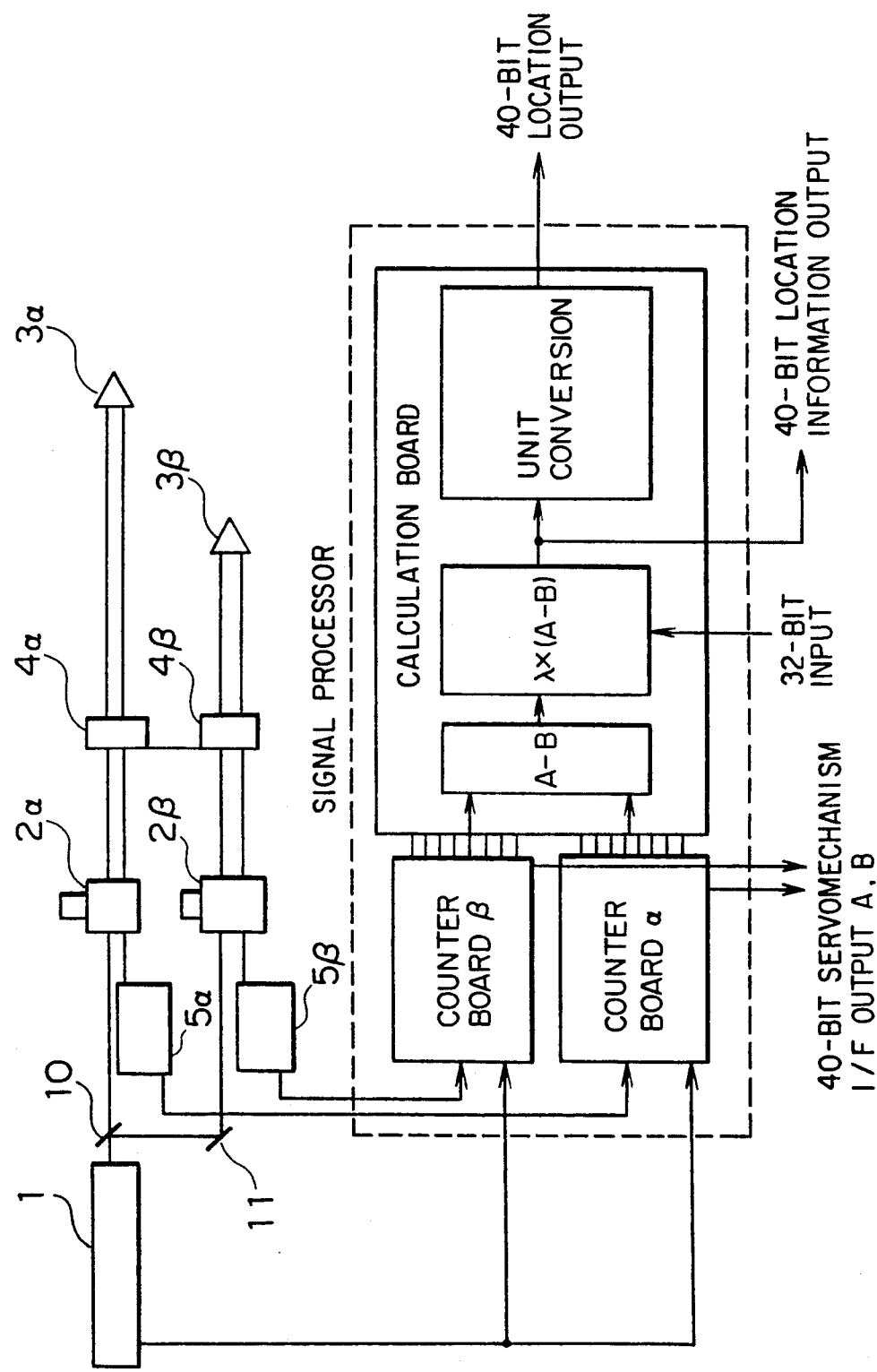
FIG. 11 is a schematic structural diagram showing a measuring unit of the second embodiment of the invention.

In the apparatus in FIG. 11, movable mirror 3β is fixed at the reference position on the base on which a driving means for movable mirror 3α is fixed. Namely, movable mirror 3β is fixed on the base 6 so that it is positioned on a vertical plane passing the axis of spindle 9 in Figure. Likewise, and fixed mirror 4β is fixed on the base on which fixed mirror 4α is fixed; i.e., on driving rail 7 in FIGS. 17 and 18 so that it may occupy the same position as that of fixed mirror 4α, side by side, in the direction of an optical path. In the apparatus in FIG. 13, movable mirror 3β is fixed on moving object 8R on which movable mirror 3α is fixed, and fixed mirror 4β is fixed on the same base as that for fixed mirror 4α. Incidentally, moving object 8R is rotated by the driving means for a small angle, shown with an arrow, against the base on which the driving means and fixed mirrors 4α and 4β are fixed, which is different from moving object 8 or 8' in FIG. 17 or 18.

Figure 16:
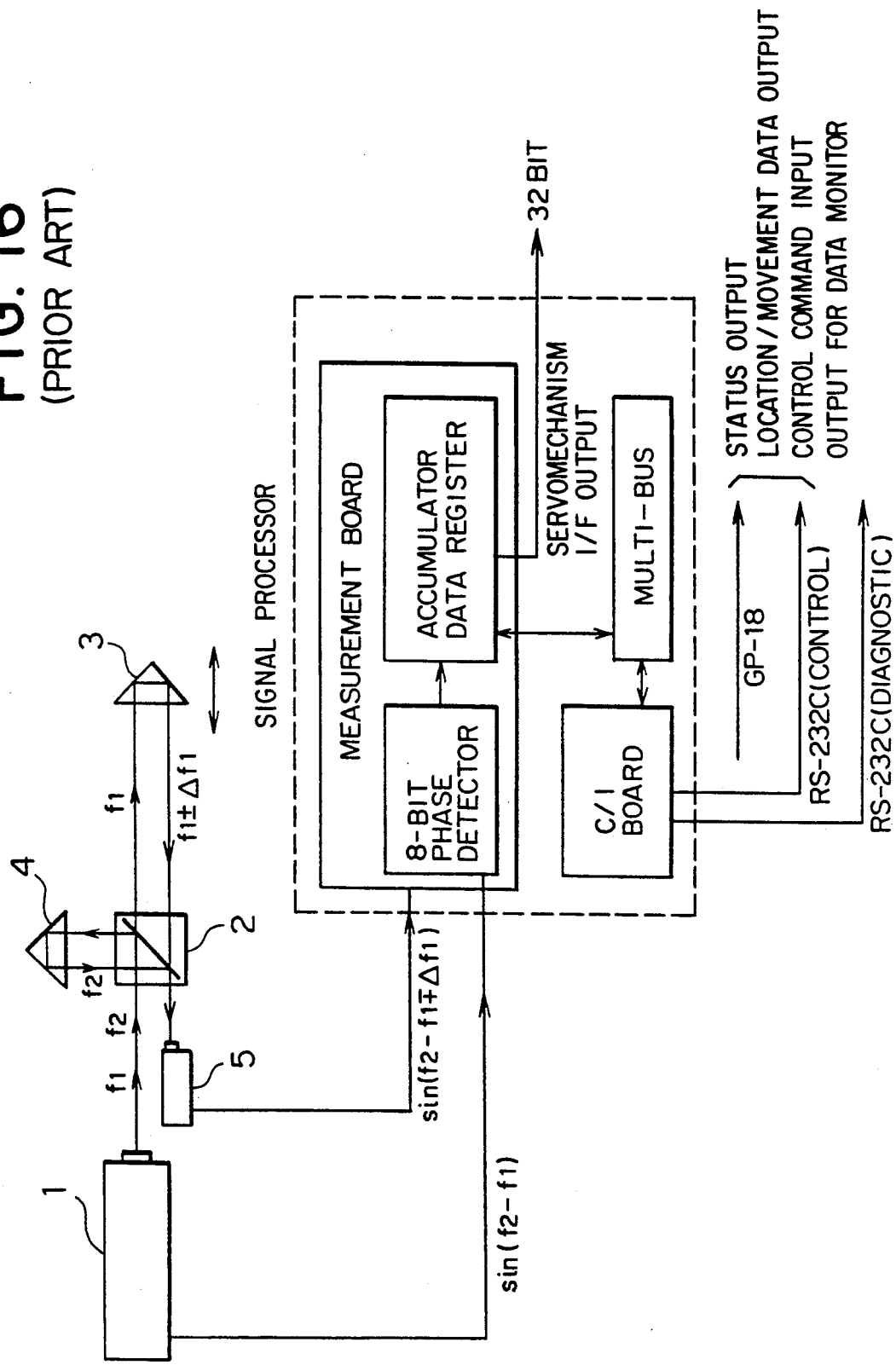
FIG. 16 is a schematic diagram showing an example of a conventional movement measuring apparatus of a laser type.

Each of counter board α of a signal processing apparatus, to which electrical signals similar to output from receiver 5 and two-frequency laser 1 in FIG. 16 are inputted from receiver 5α and two-frequency laser 1 and counter board β to which similar electrical signals are inputted from receiver 5β and two-frequency laser 1, is composed only of a portion up to the point where information that is proportional to vt/λ relating to the movement direction and movement distance of movable mirror 3 among the counter board in a signal processing apparatus in FIG. 16. The basis for the foregoing is that the composition of counter boards α and β can be simple by conducting calculation for obtaining vt by multiplying with λ on the calculation board in the next step because α-signal-generating means and β-signal-generating means are using the same two-frequency laser 1 in common in the illustrated example and thereby λ is the same. When the α-signal-generating means and the β-signal-generating means use different lasers, counter boards α and β are the same as a measurement board of a signal processing apparatus in FIG. 16. Further, these counter boards are the same as the fringe counting circuit of FIG. 1 in the fringe-count type system.

Figure 14:
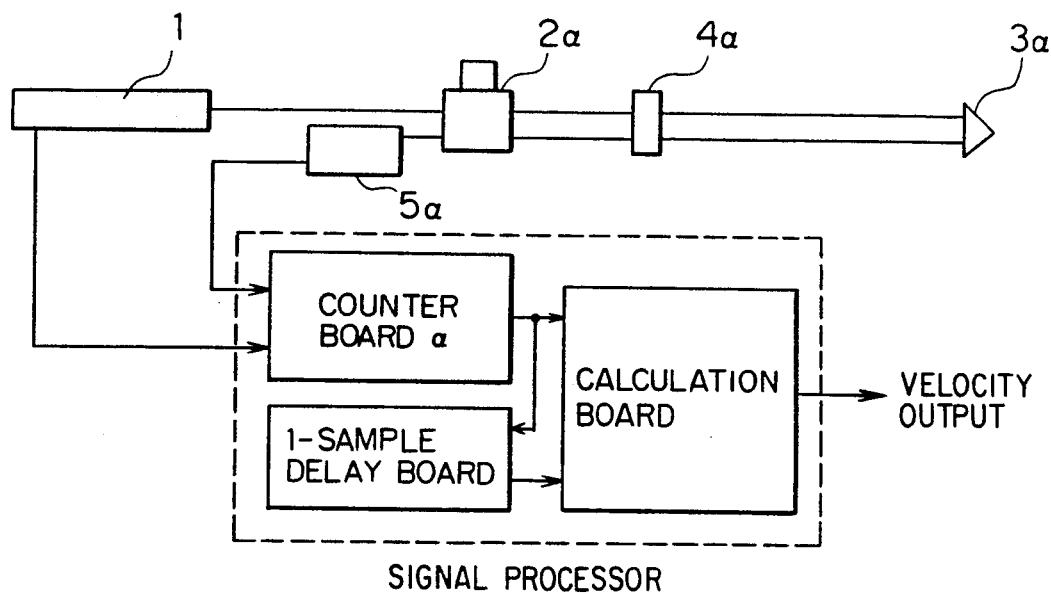

An apparatus in FIG. 14 employs a one-sample-delay board that receives output signals from counter board α and outputs them to a calculation board after a certain period of delay, as a β-signal-generating means. An apparatus in FIG. 15 employs a personal computer that outputs signals, which are target values for output signals of counter board α, as a β-signal-generating means.

Figure 12:
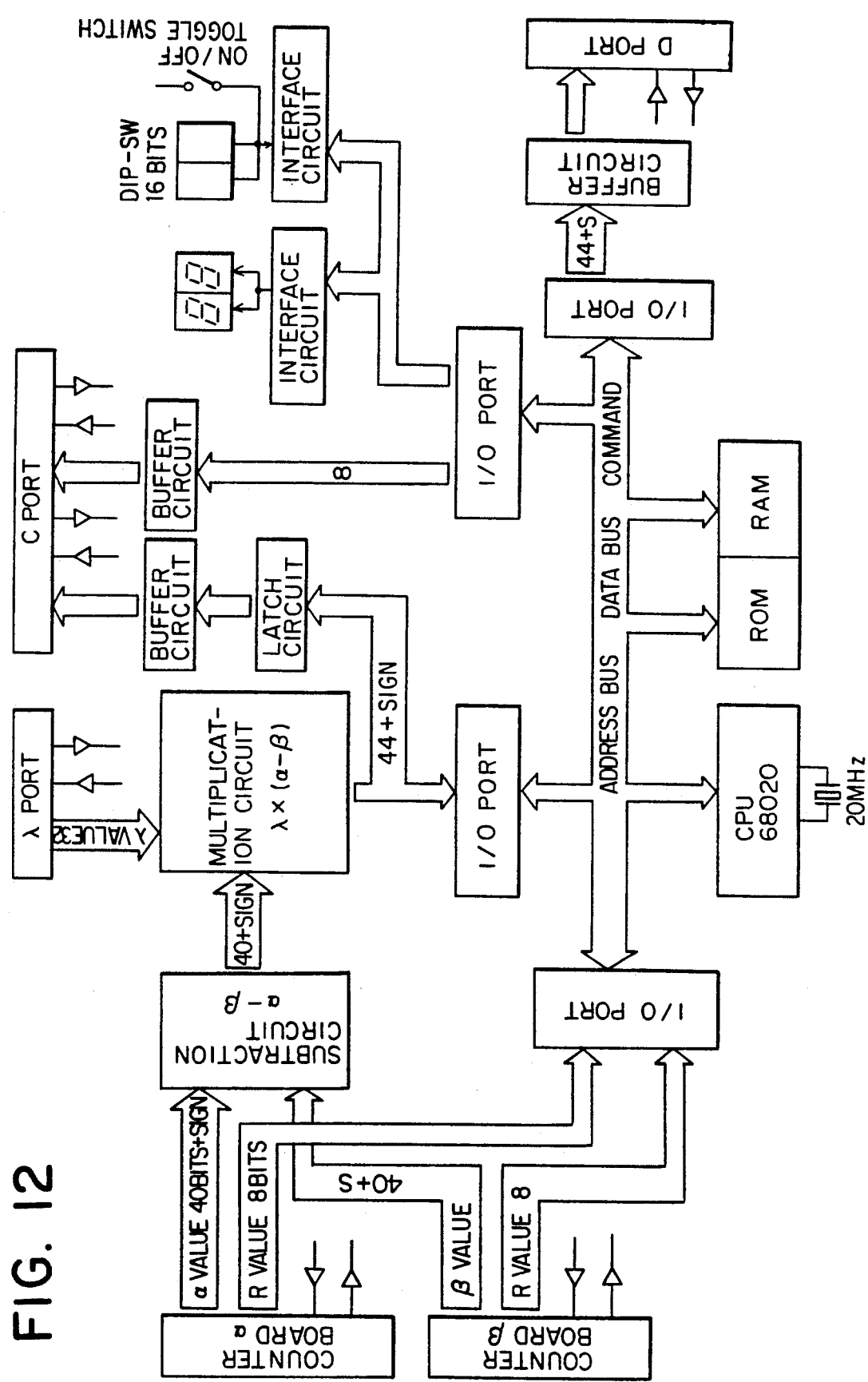
FIG. 12 is a block circuit diagram showing an example of a signal processing means used in a measuring apparatus of the invention.
Figure 13:
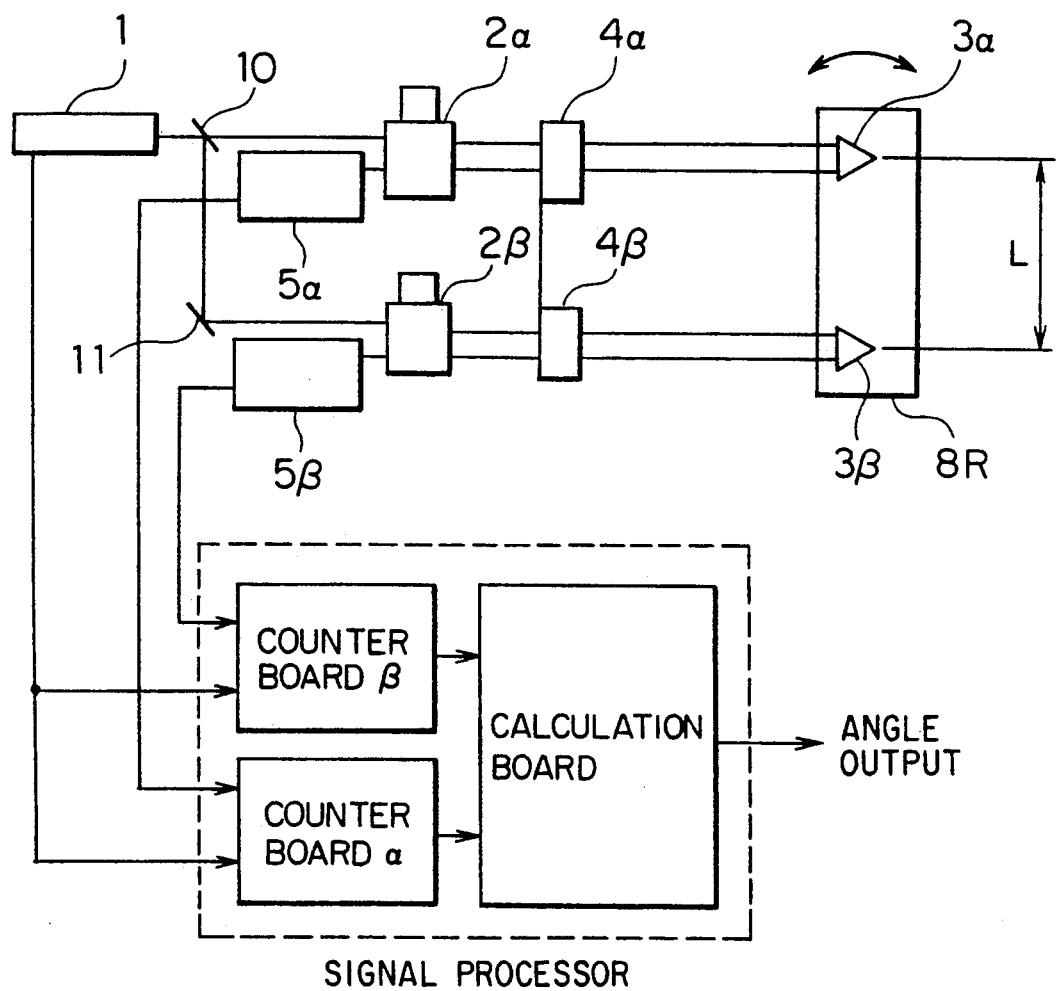
FIGS. 13, 14 and 15 are schematic diagrams showing measuring apparatuses in first, second and third examples of the second embodiment, respectively.
Figure 15:
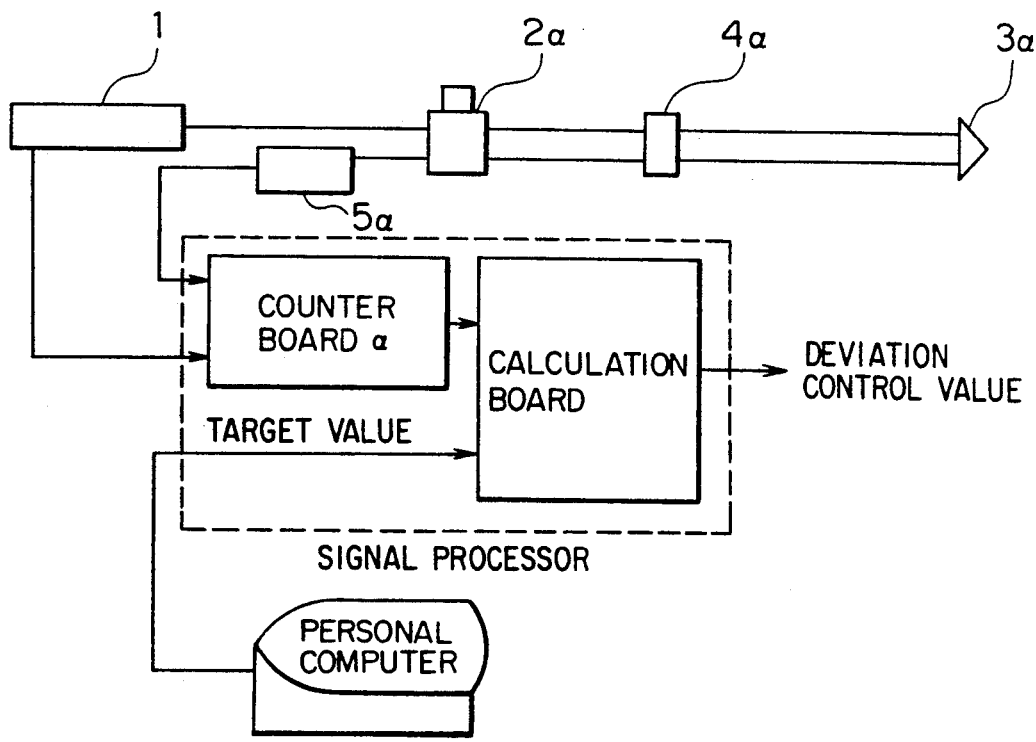

In a calculation board whose signal processor is shown in FIG. 12 in detail, signals from counter board α as those stated above and β signals as those stated above from counter board β in the examples in FIGS. 11 and 13, from one sample delay board in the example in FIG. 14, and from a personal computer in the example in FIG. 15, are inputted in a subtraction circuit wherein $(\alpha - \beta)$ signals are prepared. The $(\alpha - \beta)$ signals and λ value signals from λ port are inputted in a multiplication circuit, wherein $\lambda(\alpha - \beta)$ signals are prepared. This $\lambda(\alpha - \beta)$ corresponds to a relative distance between movable mirror 3α and movable mirror 3β in the example in FIG. 11; to a relative distance in the direction of an optical path of a laser beam between movable mirror 3α and movable mirror 3β, namely, a rotating angle of moving object 8R in the example in FIG. 13; to a movement distance of movable mirror 3α in a certain constant period of time, namely, the speed in the example in FIG. 14; and to the difference between the distance from fixed mirror 4α to movable mirror 3α and a target distance in the example in FIG. 15. Therefore, $\lambda(\alpha - \beta)$ signals are outputted to a display means or to a drive-control means for movable mirror 3 through C port or D port, without processing or after unit-converting in case of need. Thereby, in the example in FIG. 11, a moving object can be drive-controlled accurately against the reference position on the base; a rotating angle of moving object 8R can be measured in the example in FIG. 13; the speed of moving object at each time can be measured in the example in FIG. 14; and a moving object can be subjected to the programmed drive-control in the example in FIG. 15.

Incidentally, R value shown in FIG. 12 is an amplitude value of $R \sin(2\pi n + \theta)$ signal (where, $2\pi n + \theta$ is α or β) obtained from photoelectrically converted signals from interference beams, or from electrical signals from a laser, or from photoelectrically converted signals from laser beams. Pio is an I/0 port.

As stated above, a movement measurement apparatus of the invention can be used, for accurate measurement or control of the movement of a moving object against a reference position on the base; for measurement or control of small angle rotation of a moving object; for measurement of speed change of a moving object; and for programmed movement control of a moving object, which is an excellent effect.

What is claimed is:

1. A displacement meter for measuring a displacement of an object, comprising:
    means for generating a displacement signal corresponding to a displacement of said object;
    means for generating a first signal corresponding to $R\sin\theta$ value of said displacement signal, and a second signal corresponding to $R\cos\theta$ value of said displacement signal, wherein R represents an amplitude and $\theta$ represents a phase of said displacement signal;
    means for storing a displacement value defined by said first signal and said second signal, where $\theta$ is between 0 and $2\pi$;
    means for transferring a position signal corresponding to said displacement value from said storing means according to said first signal and said second signal;
    means for counting a number, being defined as dividing $\theta$ by $2\pi$, corresponding to said displacement signal; and
    means for determining said displacement of sad object according to said number of said position signal.

2. The displacement meter of claim 1, wherein said storing means is prearranged into quadrants; and further wherein said counting means includes;
    means for determining a first value of said displacement value corresponding to a first displacement between an original location of said object and a first location of said object;
    means for determining a second value of said displacement value corresponding to a second displacement between said original location and a second location of said object;
    means for up-counting said number when said first value is a value associated with a fourth quadrant of said storing means and said second value is a value associated with a first quadrant of said storing means; and
    means for down-counting said number when said first value is a value associated with said first quadrant and said second value is a value associated with said fourth quadrant.

3. The displacement meter of claim 1, wherein said storing means is prearranged into quadrants; and further wherein said counting means includes:
means for determining a first value of said displacement value corresponding to a first displacement between an original location of said object and a first location of said object;
means for determining a second value of said displacement value corresponding to a second displacement between said original location and a second location of said object;
means for up-counting said number when said first value is a value associated with either a third quadrant or a fourth quadrant of said storing means, and said second value is a value within a first reference area which is defined from said original location to a location $\pi$ behind said first location; and
means for down-counting said number when said first value si a value associated with either a first quadrant or a second quadrant of said storing means, and said second value is a value within a second reference area which is defined from a location $\pi$ beyond said first location to said original location.

4. The displacement meter of claim 1, further comprising:
means for storing an R value defined by said first signal and said second signal;
means for generating a digital R value signal corresponding to said R value from said R value storing means according to said first signal and said second signal; and
means for indicating when a value of said digital R value signal is lower than a predetermined value.

5. The displacement meter of claim 1, wherein said displacement meter is a laser interferometric displacement meter.

6. A displacement meter for measuring a moving distance of an object, comprising;
means for generating a source light beam;
means for dividing said source light beam to a measuring beam and a reference beam;
means for reflecting said measuring beam, said reflecting means placed on said objects;
means for composing said reference beam and said reflected measuring beam into a composed beam;
means for generating a first signal corresponding to $R\sin\theta$ value of said composed beam, and a second signal corresponding to $R\cos\theta$ value of said composed beam, wherein R represents an amplitude and $\theta=2\pi(Lm-Lr)/\lambda$, where Lm represents a wave number length of said reflected measuring beam, and Lr represents a wave number length of sad reference beam;
means for storing a distance value defined by said first signal and said second signal, wherein $\theta$ is between 0 and $2\pi$;
means for transferring a position signal corresponding to said distance value from said storing means according to said first signal and said second signal;
means for counting a number, being defined as dividing $\theta$ by $2\pi$, corresponding to said composed beam; and
means for determining said moving distance of said object according to said number and said position signal.

7. The displacement meter of claim 6, wherein said storing means is prearranged into quadrants; and further wherein said counting means includes:
means for determining a first value of said distance value corresponding to a first distance between an original location of said object and a first location of said object;
means for determining a second value of said distance value corresponding to a second distance between said original location and a second location of said object;
means for up-counting said number when said first value is a value associated with a fourth quadrant of said storing means and said second value is a value associated with a first quadrant of said storing means; and
mean for down-counting said number when said first value is a value associated with said first quadrant and said second value is a value associated with said fourth quadrant.

8. The displacement meter of claim 6, wherein said storing means is prearranged into quadrants; and further wherein said counting means includes:
means for determining a first value of said distance value corresponding to a first distance between an original location of said object and a first location of said object;
means for determining a second value of said distance value corresponding to a second distance between said original location and a second location of said object;
means for up-counting said number when said first value is a value associated with either a third quadrant or a fourth quadrant of said storing means, and said second value is a value within a first reference area which is defined from said original location to a location $\pi$ behind said first location; and
means for down-counting said number when said first value is a value associated with either a first quadrant or a second quadrant of said storing means, and said second value is a value within a second reference area which is defined from a location $\pi$ beyond said first location to said original location.

9. The displacement meter of claim 6, further comprising:
means for storing an R value defined by said first signal and said second signal;
means for generating a digital R value signal corresponding to said R value from said R value storing means according to said first signals and said second signal; and
means for indicating when a value of said digital R value signal is lower than a predetermined value.

* * * * *

UNITED STATES PATENT AND TRADEMARK OFFICE
CERTIFICATE OF CORRECTION

PATENT NO. : 5,287,166
DATED : February 15, 1994
INVENTOR(S) : Shigeru Hosoe

Page 1 of 2

It is certified that error appears in the above-indentified patent and that said Letters Patent is hereby corrected as shown below:

On the title page, item [54] and column 1, line 2, change "STARED" to --STORED--.

Item [57] Abstract, line 16, after "signal" insert --;--.

Claim 1, column 16, line 48, change "sad" to --said--.

Claim 1, column 17, line 49, change "objects" to --object--.

Claim 6, column 17, line 60, change "sad" to --said--.

Claim 6, column 17, line 62, change "wherein" to --where--.

Claim 7, column 18, line 26, change "mean" to --means--.

UNITED STATES PATENT AND TRADEMARK OFFICE
CERTIFICATE OF CORRECTION

PATENT NO. : 5,287,166
DATED : February 15, 1994
INVENTOR(S) : Shigeru Hosoe

It is certified that error appears in the above-indentified patent and that said Letters Patent is hereby corrected as shown below:

Claim 9, column 18, line 59, change "signals" to --signal--.

Signed and Sealed this

Twenty-second Day of November, 1994

Attest:

BRUCE LEHMAN

*Attesting Officer*    *Commissioner of Patents and Trademarks*